United States Patent
Jin et al.

(10) Patent No.: US 10,939,333 B2
(45) Date of Patent: Mar. 2, 2021

(54) COMMUNICATION METHOD AND COMMUNICATIONS APPARATUS TO IMPLEMENT A NETWORK SLICE BASED SERVICE IN A CENTRAL UNIT (CU)-DISTRIBUTED UNIT (DU) ARCHITECTURE

(71) Applicant: HUAWEI TECHNOLOGIES CO., LTD., Guangdong (CN)

(72) Inventors: Yinghao Jin, Shanghai (CN); Feng Han, Shanghai (CN); Wei Tan, Shanghai (CN); Hong Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/506,734

(22) Filed: Jul. 9, 2019

(65) Prior Publication Data

US 2019/0335366 A1  Oct. 31, 2019

Related U.S. Application Data

(63) Continuation of application No. PCT/CN2018/105171, filed on Sep. 12, 2018.

(30) Foreign Application Priority Data

Sep. 23, 2017 (CN) .......................... 201710869441.9

(51) Int. Cl.
*H04W 76/15* (2018.01)
*H04W 36/00* (2009.01)
(Continued)

(52) U.S. Cl.
CPC . *H04W 36/0033* (2013.01); *H04W 36/00837* (2018.08); *H04W 76/10* (2018.02);
(Continued)

(58) Field of Classification Search
CPC ....... H04W 36/0033; H04W 36/00837; H04W 76/27; H04W 76/10; H04W 76/12;
(Continued)

(56) References Cited

U.S. PATENT DOCUMENTS

2016/0073278 A1  3/2016  Roessler et al.
2017/0079059 A1  3/2017  Li et al.
(Continued)

FOREIGN PATENT DOCUMENTS

CN       105813195 A       7/2016
CN       106162730 A       11/2016
(Continued)

OTHER PUBLICATIONS

3GPP TR 38.801 v. 14.0.0, 3rd Generation Partnership Project; Technical Specification Group Radio Access Network; Study on New Radio Access Technology: Radio Access Architecture and Interfaces (Release 14), Mar. 2017, pp. 1-91 (Year: 2017).*
(Continued)

*Primary Examiner* — Un C Cho
*Assistant Examiner* — Lalita W Pace
(74) *Attorney, Agent, or Firm* — Fish & Richardson P.C.

(57) ABSTRACT

This application discloses a communication method and a communications apparatus. The method includes: sending, by a central unit of a radio access network (RAN), to a distributed unit of the RAN, a UE context setup request message, wherein the UE context setup request message comprises an identifier of a bearer to be established, and indication information of a network slice corresponding to the bearer; and sending, by the distributed unit of the RAN, to the central unit of the RAN a response message in response to the UE context setup request message.

28 Claims, 9 Drawing Sheets

(51) Int. Cl.
*H04W 76/27* (2018.01)
*H04W 76/10* (2018.01)
*H04W 76/11* (2018.01)

(52) U.S. Cl.
CPC ............ *H04W 76/11* (2018.02); *H04W 76/15* (2018.02); *H04W 76/27* (2018.02)

(58) Field of Classification Search
CPC .................. H04W 76/18; H04W 76/15; H04L 29/08585; H04L 29/08576
See application file for complete search history.

(56) References Cited

U.S. PATENT DOCUMENTS

| | | | | |
|---|---|---|---|---|
| 2017/0367036 | A1* | 12/2017 | Chen ..................... | H04W 76/10 |
| 2018/0035399 | A1* | 2/2018 | Xu .......................... | H04W 4/70 |
| 2018/0192445 | A1 | 7/2018 | Jiang | |
| 2018/0206152 | A1 | 7/2018 | Zhang et al. | |
| 2018/0213579 | A1* | 7/2018 | Hong .................... | H04W 76/12 |
| 2018/0270666 | A1* | 9/2018 | Lee ...................... | H04L 63/205 |
| 2018/0317148 | A1 | 11/2018 | Jin et al. | |
| 2018/0324645 | A1* | 11/2018 | Park .................. | H04W 36/0016 |
| 2018/0324663 | A1* | 11/2018 | Park ...................... | H04W 36/08 |
| 2018/0338277 | A1* | 11/2018 | Byun .................... | H04W 48/10 |
| 2019/0053183 | A1* | 2/2019 | Park ........................ | H04B 7/04 |
| 2019/0075578 | A1 | 3/2019 | Kim | |
| 2019/0150220 | A1* | 5/2019 | Byun .................... | H04W 80/08 370/329 |
| 2019/0158360 | A1* | 5/2019 | Xu .......................... | H04L 41/12 |
| 2019/0159086 | A1* | 5/2019 | Xu ........................ | H04W 36/08 |
| 2019/0166647 | A1* | 5/2019 | Velev .................... | H04W 76/12 |
| 2019/0174561 | A1* | 6/2019 | Sivavakeesar ........ | H04W 48/12 |
| 2019/0222291 | A1* | 7/2019 | Wang ..................... | H04B 7/005 |
| 2019/0223251 | A1* | 7/2019 | Jiang ..................... | H04W 76/19 |

FOREIGN PATENT DOCUMENTS

| | | | | |
|---|---|---|---|---|
| CN | 106538037 | A | 3/2017 | |
| CN | 106713406 | A | 5/2017 | |
| CN | 106792888 | A | 5/2017 | |
| CN | 106851589 | A | 6/2017 | |
| CN | 106982410 | A | 7/2017 | |
| CN | 106982458 | A | 7/2017 | |
| CN | 107105458 | A | 8/2017 | |
| CN | 107148086 | A | 9/2017 | |
| CN | 107197486 | A | 9/2017 | |
| CN | 108668381 | A | 10/2018 | |
| JP | 2016506657 | A | 3/2016 | |
| KR | 20170106624 | A | 9/2017 | |
| WO | 2017005208 | A1 | 1/2017 | |
| WO | 2017045530 | A1 | 3/2017 | |
| WO | WO-2018009340 | A1 * | 1/2018 | ............ H04W 88/08 |
| WO | WO-2019031915 | A1 * | 2/2019 | ............ H04W 76/15 |

OTHER PUBLICATIONS

3GPP TR 28.801 V2.0.1 (Sep. 2017), "3rd Generation Partnership Project; Technical Specification Group Services and System Aspects; Telecommunication management; Study on management and orchestration of network slicing for next generation network (Release 15)," Technical Report, Sep. 2017, 78 pages.
3GPP TS 38300 V1.0.0 (Sep. 2017), "3rd Generation Partnership Project; Technical Specification Group Radio Access Network; NR; NR and NG-RAN Overall Description; Stage 2 (Release 15)," Technical Specification, Sep. 2017, 59 pages.
3GPP TS 38.473 V0.3.0 (Sep. 2017), "3rd Generation Partnership Project; Technical Specification Group Radio Access Network; NG-RAN; F1 application protocol (F1AP) (Release 15)," Technical Specification, Sep. 2017, 20 pages.
Bakker et al., "5G Novel Radio Multiservice adaptive network Architecture (5G NORMA)", Deliverable D4.2; RAN Architecture Components: Final Report; Project: H2020-ICT-2014-2 5G Norma; Jul. 2017, 158 pages.
Office Action issued in Chinese Application No. 201810710559.1 dated Jan. 11, 2019, 5 pages.
Office Action issued in Chinese Application No. 201811035495.6 dated Jun. 20, 2019, 6 pages.
PCT International Search Report and Written Opinion issued in International Application No. PCT/CN2018/105171 dated Dec. 3, 2018, 12 pages (partial English translation).
R3-170675—Ericsson, "Clarifications on the use of NSSAI in Network Slicing," 3GPP TSG-RAN WG3 #95, Athens, Greece, Feb. 13-17, 2017, 5 pages.
R3-172652—ETSI MCC, "Report of 3GPP TSG RAN3 ad hoc meeting NR#02 held in Qingdao, P.R. China; Jun. 27-29, 2017," 3GPP TSG RAN meeting #97, Spokane, USA, Apr. 3-7, 2017, 166 pages.
R3-180139—ZTE Corporation, "NW slicing for high layer functional split," 3GPP TSG-RAN WG3 NR AdHoc, Sophia Antipolis, France, Jan. 22-26, 2018, 7 pages.
S2-163429—Huawei et al., "Update of Solution 6.1.1," 3GPP TSG SA WG2 Meeting #116, Vienna, Austria, Jul. 11-15, 2016, 7 pages.
S2-165260—Huawei et al., "Update of Solution 6.1.1: The required identities for network slice selection," 3GPP TSG SA WG2 Meeting #116 Bis, Sanya, P.R of China, Aug. 29-Sep. 3, 2016, 10 pages.
Search Report issued in Chinese Application No. 201810710559.1 dated Sep. 13, 2018, 6 pages.
Search Report issued in Chinese Application No. 201811035495.6 dated Nov. 2, 2018, 6 pages.
Tdoc SP-170750—SA5, "Presentation of Specification/Report to TSG:TR 28.801 Study on management and orchestration of network slicing for next generation network; Version 2.0.0," 3GPP TSG-SA Meeting #77, Sapporo, Japan, Sep. 13-15, 2017, 1 page.
3rd Generation Partnership Project,Technical Specification Group Radio Access Network, Study on New Radio Access Technology, Radio Access Architecture and Interfaces(Release 14) 3GPP Standard, Technical Report, 3GPP TR 38.801, Mar. 6, 2017, 90 pages.
Extended European Search Report issued in European Application No. 18858907.1 dated Jan. 23, 2020, 11 pages.
EPO Communication pursuant to Article 94(3) EPC issued in European Application No. 18858907.1 dated Oct. 9, 2020, 12 pages.
ZTE, "The proposed Stage 2 TP for CU-DU interface," 3GPP TSG RAN WG3 Meeting #95bis, R3-171017, Spokane, USA, Apr. 3-7, 2017, 6 pages.
3GPP TR 38.801 V2.0.0 (Mar. 2017), "3rd Generation Partnership Project;Technical Specification Group Radio Access Network; Study on New Radio Access Technology; Radio Access Architecture and Interfaces (Release 14)," Mar. 2017, 90 pages.
NEC, "TS 38.401 v0.3.0 covering agreements of RAN3 #97," 3GPP TSG-RAN WG3 #97, R3-173449, Berlin, Germany, Aug. 21-25, 2017, 11 pages.
Office Action issued in Japanese Application No. 2019-551452 dated Oct. 5, 2020, 11 pages (with English translation).
3GPP TR 38.803 V14.0.0 (Mar. 2017), "3rd Generation Partnership Project;Technical Specification Group Radio Access Network;Study on New Radio Access Technology;RF and co-existence aspects(Release 14)," Mar. 2017, 192 pages.
Ericsson, "On the functional distribution over the F1 interface," 3GPP TSG-RAN WG3 #96, Tdoc R3-171997, Hangzhou, China, May 15-19, 2017, 4 pages.
Huawei, "L1/L2 configuration for gNB-DU," 3GPP TSG RAN WG3 meeting #97, R3-173127, Berlin, Germany, Aug. 21-25, 2017, 3 pages.
Huawei, "UE context management on F1," 3GPP TSG-RAN3 Meeting #97, R3-173106, Berlin, Germany, Aug. 21-25, 2017, 4 pages.
Office Action issued in Korean Application No. 2019-7026131 dated Dec. 16, 2020, 19 pages (with English translation).

* cited by examiner

COMMUNICATION METHOD AND COMMUNICATIONS APPARATUS TO IMPLEMENT A NETWORK SLICE BASED SERVICE IN A CENTRAL UNIT (CU)-DISTRIBUTED UNIT (DU) ARCHITECTURE

CROSS-REFERENCE TO RELATED APPLICATIONS

This application is a continuation of International Application No. PCT/CN2018/105171, filed on Sep. 12, 2018, which claims priority to Chinese Patent Application No. 201710869441.9, filed with the Chinese Patent Office on Sep. 23, 2017, the disclosures of the aforementioned applications are incorporated herein by reference in their entireties.

TECHNICAL FIELD

This application relates to the field of communications technologies, and in particular, to a communication method and a communications apparatus.

BACKGROUND

A concept of network slicing is introduced in a next-generation mobile communications network technology (for example, the 5th generation (5G) mobile communications), to serve different tenants and differentiated services by using a customized network. A core network (CN) device, a radio access network (RAN) device, and a terminal device each can support a plurality of network slices. Because RAN devices from different vendors differ in function, or because different RAN devices have different network slice supporting capabilities due to operator policies, the RAN devices also support different network slice-based services within coverage areas of the RAN devices.

In the next-generation mobile communications network technology, an architecture of the RAN device is divided. To be specific, one RAN device includes one central unit (CU) and one or more distributed units (DU). How to implement a network slice-based service in a CU-DU architecture is a problem worth considering.

SUMMARY

This application provides a communication method and a communications apparatus, to implement a network slice-based service in a CU-DU architecture.

According to one aspect, a communication method is provided, and the method includes: sending, by a distributed unit, a connection setup request message to a central unit; and receiving, by the distributed unit, a connection setup response message from the central unit, where the connection setup request message or the connection setup response message includes information of network slice supported by the distributed unit.

In this design, the information of network slice supported by the distributed unit is exchanged between the distributed unit and the central unit by using a connection setup process, so that the distributed unit and the central unit provide a network slice-based service for a terminal device.

In a possible design, the connection setup response message further includes information of network slice supported by the central unit.

In this design, the central unit notifies the distributed unit of a network slice supported by the central unit, and the distributed unit can provide the terminal device only with a network slice-based service that is supported by both the distributed unit and the central unit.

In another possible design, the method further includes: sending, by the distributed unit, a configuration update message to the central unit, where the configuration update message includes updated information of network slice supported by the distributed unit.

In this design, when a network slice supported by the distributed unit is updated, the distributed unit needs to update the network slice information to the central unit.

In still another possible design, the information of network slice supported by the distributed unit includes at least one of or a combination of the following: Indication information of network slice supported by at least one cell of the distributed unit; a cell identifier of the at least one cell of the distributed unit and Indication information of network slice supported by each of the at least one cell; or an identifier of a tracking area or a registration area corresponding to the at least one cell of the distributed unit and Indication information of network slice supported by each tracking area or each registration area in the tracking area or the registration area corresponding to the at least one cell.

In this design, a plurality of representation forms of the network slice information are provided. Certainly, this application is not limited to these several representation forms.

Correspondingly, another aspect of this application further provides a communications apparatus, which can implement the foregoing communication method. The communications apparatus has a function of implementing behavior of the distributed unit in the foregoing method. The function may be implemented by using hardware, or may be implemented by using software executing corresponding hardware. The hardware or the software includes one or more modules corresponding to the foregoing function.

In a possible design, the communications apparatus includes: a transmitting unit, configured to send a connection setup request message to a central unit; and a receiving unit, configured to receive a connection setup response message from the central unit, where the connection setup request message or the connection setup response message includes information of network slice supported by the distributed unit.

In a possible design, the connection setup response message further includes information of network slice supported by the central unit.

In a possible design, the transmitting unit is further configured to send a configuration update message to the central unit, where the configuration update message includes updated information of network slice supported by the distributed unit.

In a possible design, the information of network slice supported by the distributed unit includes at least one of or a combination of the following: Indication information of network slice supported by at least one cell of the distributed unit; a cell identifier of the at least one cell of the distributed unit and Indication information of network slice supported by each of the at least one cell; or an identifier of a tracking area or a registration area corresponding to the at least one cell of the distributed unit and Indication information of network slice supported by each tracking area or each registration area in the tracking area or the registration area corresponding to the at least one cell.

When the distributed unit is a chip, the receiving unit may be an input unit such as an input circuit or a communications interface, and the transmitting unit may be an output unit such as an output circuit or a communications interface. When the communications apparatus is a device, the receiving unit may be a receiving device (or may be referred to as a receiver), and the transmitting unit may be a transmitting device (or may be referred to as a transmitter).

In another possible design, the communications apparatus includes a receiver, a transmitter, a memory, and a processor. The memory stores a set of program code, and the processor is configured to invoke the program code stored in the memory, to perform the following operations: controlling the transmitter to send a connection setup request message to a central unit; and controlling the receiver to receive a connection setup response message from the central unit, where the connection setup request message or the connection setup response message includes information of network slice supported by the distributed unit.

Based on a same invention concept, for a problem-resolving principle and beneficial effects of the apparatus, refer to the foregoing possible method implementations and brought beneficial effects of the distributed unit. Therefore, for implementation of the apparatus, refer to the implementation of the method. Repeated parts are not described again.

According to still another aspect, a communication method is provided, and the method includes: receiving, by a central unit, a connection setup request message from a distributed unit; and sending, by the central unit, a connection setup response message to the distributed unit, where the connection setup request message or the connection setup response message includes information of network slice supported by the distributed unit.

In this design, the distributed unit and the central unit obtain, by using a connection setup process, the information of network slice supported by the distributed unit, so that the distributed unit and the central unit subsequently provide a network slice-based service for a terminal device.

In a possible design, the connection setup response message further includes information of network slice supported by the central unit.

In this design, the central unit notifies the distributed unit of a network slice supported by the central unit, and the distributed unit can only support a network slice that is supported by both the distributed unit and the central unit.

In another possible design, the method further includes: receiving, by the central unit, a configuration update message from the distributed unit, where the configuration update message includes updated information of network slice supported by the distributed unit.

In this design, when a network slice supported by the distributed unit is updated, the distributed unit needs to update the network slice information to the central unit.

In still another possible design, the method further includes: sending, by the central unit, a configuration update message to the distributed unit, where the configuration update message includes updated information of network slice supported by the central unit.

In this design, when a network slice supported by the central unit is updated, the central unit needs to update the network slice information to the distributed unit.

In yet another possible design, the configuration update message or the connection setup response message further includes network slice configuration information. The network slice configuration information includes at least one of the following configuration information: layer 1 protocol stack configuration information, layer 2 protocol stack configuration information, physical resource information, frequency band information corresponding to a network slice, frequency information corresponding to a network slice, or status information supported by a network slice.

In this design, because the network slice information of the distributed unit is configured for the central unit, the central unit may further send the network slice configuration information when sending the information of network slice supported by the central unit to the distributed unit, so that the distributed unit can configure a network slice based on the configuration information, to provide a network slice-based service for the terminal device.

Correspondingly, still another aspect of this application further provides a communications apparatus, which can implement the foregoing communication method. The communications apparatus has a function of implementing behavior of the central unit in the foregoing method. The function may be implemented by using hardware, or may be implemented by using software executing corresponding hardware. The hardware or the software includes one or more modules corresponding to the foregoing function.

In a possible design, the communications apparatus includes: a receiving unit, configured to receive a connection setup request message from a distributed unit; and a transmitting unit, configured to send a connection setup response message to the distributed unit, where the connection setup request message or the connection setup response message includes information of network slice supported by the distributed unit.

In a possible design, the connection setup response message further includes information of network slice supported by the central unit.

In a possible design, the transmitting unit is further configured to send a configuration update message to the distributed unit, where the configuration update message includes updated information of network slice supported by the central unit.

In a possible design, the configuration update message further includes network slice configuration information. The network slice configuration information or the connection setup response message includes at least one of the following configuration information: layer 1 protocol stack configuration information, layer 2 protocol stack configuration information, physical resource information, frequency band information corresponding to a network slice, frequency information corresponding to a network slice, or status information supported by a network slice.

When the communications apparatus is a chip, the receiving unit may be an input unit such as an input circuit or a communications interface, and the transmitting unit may be an output unit such as an output circuit or a communications interface. When the communications apparatus is a device, the receiving unit may be a receiving device (or may be referred to as a receiver), and the transmitting unit may be a transmitting device (or may be referred to as a transmitter).

In another possible design, the communications apparatus includes a receiver, a transmitter, a memory, and a processor. The memory stores a set of program code, and the processor is configured to invoke the program code stored in the memory, to perform the following operations: controlling the receiver to receive a connection setup request message from a distributed unit; and controlling the transmitter to send a connection setup response message to the distributed unit, where the connection setup request message or the connection setup response message includes information of network slice supported by the distributed unit.

Based on a same invention concept, for a problem-resolving principle and beneficial effects of the apparatus, refer to the foregoing possible method implementations and brought beneficial effects of the central unit. Therefore, for implementation of the apparatus, refer to the implementation of the method. Repeated parts are not described.

According to yet another aspect, a communication method is provided, and the method includes: sending, by a central unit, a first message to a distributed unit, where the first message includes indication information of network slice corresponding to a session, a bearer, or a flow; and receiving, by the central unit, a response message from the distributed unit.

In this design, because different network slices have different layer 1 or layer 2 configurations on a RAN side, different sessions may correspond to different network slices. During session setup or modification, the central unit notifies the distributed unit of indication information of network slice corresponding to a session, bearer, or flow to be established or modified, so that the distributed unit establishes or modifies the session, bearer, or flow on an indicated network slice. Therefore, the distributed unit can accurately select a network slice, and can configure, based on network slice information corresponding to the session, an L1/L2 parameter corresponding to the network slice for a terminal device, so that sessions that belong to different network slices meet a specific QoS requirement.

In a possible design, the method further includes: sending, by the central unit, a radio resource control message to the terminal device by using the distributed unit, where the radio resource control message includes an identifier of a session, bearer, or flow that is successfully established.

In this design, the terminal device obtains the identifier of the session, bearer, or flow that is successfully established, to conduct a session with a network device.

In another possible design, the method further includes: sending, by the central unit, a path switch request message to a core network device, where the path switch request message includes an identifier of a session successfully established by the central unit or the distributed unit, and/or an identifier of a flow that corresponds to the session identifier and that is successfully established by the central unit or the distributed unit.

In this design, due to mobility of the terminal device, the terminal device needs to move from an original serving central unit or distributed unit to a new central unit or distributed unit. In this scenario, the central unit notifies the core network device of a session or flow that requires path switch, so that the core network device can send downlink data and receive uplink data based on a switched path.

In still another possible design, the first message or the response message further includes bearer duplication indication information. In this design, the terminal device may transmit same data on two paths, thereby improving data transmission reliability.

In yet another possible design, the first message further includes DU UE-AMBR indication information, and the DU UE-AMBR indication information is used to indicate an aggregate maximum bit rate enforced by the distributed unit for the terminal device.

In this design, the terminal device may perform data transmission with at least two distributed units corresponding to a same central unit, and the terminal device may transmit different data to different distributed units. The DU UE-AMBR indication information is of the first message, so that a data rate of transmission from each distributed unit to the terminal device does not exceed the aggregate maximum bit rate enforced by the distributed unit for the terminal device.

In still yet another possible design, the first message further includes configuration information of a source network device for at least one protocol stack corresponding to a bearer, and the at least one protocol stack includes an RLC protocol stack, a MAC protocol stack, and a PHY protocol stack.

In this design, the central unit adds, to the first message to be sent to the distributed unit, configuration information of the source network device for a protocol stack corresponding to a bearer of the terminal device, so that the distributed unit can perform differentiated configuration on protocol stacks, thereby simplifying operations of the distributed unit.

In a further possible design, the source network device includes any one of the following: the central unit, a source base station, a source central unit, and the core network device.

Correspondingly, still another aspect of this application further provides a communications apparatus, which can implement the foregoing communication method. The communications apparatus has a function of implementing behavior of the central unit in the foregoing method. The function may be implemented by using hardware, or may be implemented by using software executing corresponding hardware. The hardware or the software includes one or more modules corresponding to the foregoing function.

In a possible design, the communications apparatus includes: a transmitting unit, configured to send a first message to a distributed unit, where the first message includes indication information of network slice corresponding to a session, a bearer, or a flow; and a receiving unit, configured to receive a response message from the distributed unit.

In a possible design, the transmitting unit is further configured to send a radio resource control message to a terminal device by using the distributed unit, where the radio resource control message includes an identifier of a session, bearer, or flow that is successfully established.

In a possible design, the transmitting unit is further configured to send a path switch request message to a core network device, where the path switch request message includes an identifier of a session successfully established by the central unit or the distributed unit, and/or an identifier of a flow that corresponds to the session identifier and that is successfully established by the central unit or the distributed unit.

In a possible design, the first message or the response message further includes bearer duplication indication information.

In a possible design, the first message further includes DU UE-AMBR indication information, and the DU UE-AMBR indication information is used to indicate an aggregate maximum bit rate enforced by the distributed unit for the terminal device.

In a possible design, the first message further includes configuration information of a source network device for at least one protocol stack corresponding to a bearer, and the at least one protocol stack includes an RLC protocol stack, a MAC protocol stack, and a PHY protocol stack.

In a possible design, the source network device includes any one of the following: the central unit, a source base station, a source central unit, and the core network device.

When the communications apparatus is a chip, the receiving unit may be an input unit such as an input circuit or a communications interface, and the transmitting unit may be an output unit such as an output circuit or a communications interface. When the communications apparatus is a device, the receiving unit may be a receiving device (or may be referred to as a receiver), and the transmitting unit may be a transmitting device (or may be referred to as a transmitter).

In another possible design, the central unit includes a receiver, a transmitter, a memory, and a processor. The memory stores a set of program code, and the processor is configured to invoke the program code stored in the memory, to perform the following operations: sending a first message to a distributed unit by using the transmitter, where the first message includes indication information of network slice corresponding to a session, a bearer, or a flow; and receiving a response message from the distributed unit by using the receiver.

Based on a same invention concept, for a problem-resolving principle and beneficial effects of the apparatus, refer to the foregoing possible method implementations and brought beneficial effects of the central unit. Therefore, for implementation of the apparatus, refer to the implementation of the method. Repeated parts are not described.

According to yet another aspect, a communication method is provided, and the method includes: receiving, by a distributed unit, a first message from a central unit, where the first message includes indication information of network slice corresponding to a session, a bearer, or a flow; and sending, by the distributed unit, a response message to the central unit.

In this design, because different network slices have different layer 1 or layer 2 configurations on a RAN side, different sessions may correspond to different network slices. During session setup or modification, the central unit notifies the distributed unit of indication information of network slice corresponding to a session, bearer, or flow to be established or modified, so that the distributed unit establishes or modifies the session, bearer, or flow on an indicated network slice. Therefore, the distributed unit can accurately select a network slice, and can configure, based on network slice information corresponding to the session, an L1/L2 parameter corresponding to the network slice for a terminal device. Therefore, sessions that belong to different network slices meet a specific QoS requirement.

In a possible design, the method further includes: sending, by the distributed unit, a radio resource control message from the central unit to the terminal device, where the radio resource control message includes an identifier of a session, bearer, or flow that is successfully established.

In this design, the terminal device obtains the identifier of the session, bearer, or flow that is successfully established, to conduct a session with a network device.

In another possible design, after the receiving, by a distributed unit, a first message from a central unit, the method further includes: determining, by the distributed unit, whether the distributed unit supports a network slice corresponding to the indication information of network slice.

In this design, the distributed unit determines, based on a network slice supported by the distributed unit, whether the distributed unit supports the network slice corresponding to the indication information of network slice of the first message, so as to ensure that a session service can be provided.

In still another possible design, the first message or the response message further includes bearer duplication indication information.

In this design, the terminal device may transmit same data on two paths, thereby improving data transmission reliability.

In yet another possible design, the first message further includes DU UE-AMBR indication information, and the DU UE-AMBR indication information is used to indicate an aggregate maximum bit rate enforced by the distributed unit for the terminal device.

In this design, the DU UE-AMBR indication information is of the first message, so that a data rate of transmission from the distributed unit to the terminal device does not exceed the aggregate maximum bit rate enforced by the distributed unit for the terminal device.

In still yet another possible design, the first message further includes configuration information of a source network device for at least one protocol stack corresponding to a bearer, and the at least one protocol stack includes an RLC protocol stack, a MAC protocol stack, and a PHY protocol stack.

In this design, the central unit adds, to the first message to be sent to the distributed unit, configuration information of the source network device for a protocol stack corresponding to a bearer of the terminal device, so that the distributed unit can perform differentiated configuration on protocol stacks, thereby simplifying operations of the distributed unit.

Correspondingly, still another aspect of this application further provides a communications apparatus, and the communications apparatus has a function of implementing behavior of the distributed unit in the foregoing method. The function may be implemented by using hardware, or may be implemented by using software executing corresponding hardware. The hardware or the software includes one or more modules corresponding to the foregoing function.

In a possible design, the communications apparatus includes: a receiving unit, configured to receive a first message from a central unit, where the first message includes indication information of network slice corresponding to a session, a bearer, or a flow; and a transmitting unit, configured to send a response message to the central unit.

In a possible design, the transmitting unit is further configured to send a radio resource control message from the central unit to a terminal device, where the radio resource control message includes an identifier of a session, bearer, or flow that is successfully established.

In a possible design, the communications apparatus further includes a processing unit, configured to determine whether the communications apparatus supports a network slice corresponding to the indication information of network slice.

In a possible design, the first message or the response message further includes bearer duplication indication information.

In a possible design, the first message further includes DU UE-AMBR indication information, and the DU UE-AMBR indication information is used to indicate an aggregate maximum bit rate enforced by the distributed unit for the terminal device.

In a possible design, the first message further includes configuration information of a source network device for at least one protocol stack corresponding to a bearer, and the at least one protocol stack includes an RLC protocol stack, a MAC protocol stack, and a PHY protocol stack.

In a possible design, the source network device includes any one of the following: the central unit, a source base station, a source central unit, and a core network device.

When the communications apparatus is a chip, the receiving unit may be an input unit such as an input circuit or a communications interface, and the transmitting unit may be an output unit such as an output circuit or a communications interface. When the communications apparatus is a device, the receiving unit may be a receiving device (or may be referred to as a receiver), and the transmitting unit may be a transmitting device (or may be referred to as a transmitter).

In another possible design, the communications apparatus includes a receiver, a transmitter, a memory, and a processor. The memory stores a set of program code, and the processor is configured to invoke the program code stored in the memory, to perform the following operations: sending a first message from a central unit by using the receiver, where the first message includes indication information of network slice corresponding to a session, a bearer, or a flow; and sending a response message to the central unit by using the transmitter.

Based on a same invention concept, for a problem-resolving principle and beneficial effects of the apparatus, refer to the foregoing possible method implementations and brought beneficial effects of the distributed unit. Therefore, for implementation of the apparatus, refer to the implementation of the method. Repeated parts are not described.

According to yet another aspect, a communications system is provided, and the communications system includes the foregoing communications apparatuses.

According to yet another aspect, a communication method is provided, and the method includes: receiving, by a terminal device, a radio resource control message, where the radio resource control message includes an identifier of a session, bearer, or flow that is successfully established; and sending, by the terminal device, a radio resource control response message to a central unit. In this design, the terminal device obtains the identifier of the session, bearer, or flow that is successfully established, to conduct a session with a network device.

In a possible design, the radio resource control message further includes configuration information for at least one protocol stack corresponding to a bearer, and the at least one protocol stack includes at least one of the following protocol stacks: an RLC protocol stack, a MAC protocol stack, or a PHY protocol stack.

In this design, the central unit adds, to a first message to be sent to a distributed unit, configuration information of a source network device for a protocol stack corresponding to a bearer of the terminal device, and the distributed unit sends the configuration information for the protocol stack corresponding to the bearer to the terminal device, so that the terminal device can perform differentiated configuration on protocol stacks, thereby simplifying operations of the terminal device.

In another possible design, the configuration information of the at least one protocol stack corresponding to the bearer is obtained after the distributed unit performs differentiated configuration based on the configuration information of the source network device for the at least one protocol stack corresponding to the bearer.

In still another possible design, the source network device includes any one of the following: the central unit, a source base station, a source central unit, and a core network device.

Correspondingly, this application further provides a communications apparatus, which can implement the foregoing communication method. For example, the communications apparatus may be a chip (for example, a baseband chip or a communications chip) or a sending device (for example, a terminal device). The foregoing method may be implemented by software or hardware, or by executing corresponding software by hardware.

In a possible design, a structure of the communications apparatus includes a processor and a memory. The processor is configured to support the apparatus in executing a corresponding function in the foregoing communication method. The memory is configured to be coupled to the processor, and stores a necessary program (instruction) and/or data of the communications apparatus. Optionally, the communications apparatus may further include a communications interface, configured to support communication between the apparatus and another network element.

In another possible design, the communications apparatus may include: a receiving unit, configured to receive a radio resource control message, where the radio resource control message includes an identifier of a session, bearer, or flow that is successfully established; and a transmitting unit, configured to send a radio resource control response message to a central unit.

In a possible design, the radio resource control message further includes configuration information for at least one protocol stack obtained after a distributed unit performs differentiated configuration based on configuration information of a source network device for at least one protocol stack corresponding to a bearer, and the at least one protocol stack includes at least one of the following protocol stacks: an RLC protocol stack, a MAC protocol stack, or a PHY protocol stack.

In a possible design, the source network device includes any one of the following: the central unit, a source base station, a source central unit, and a core network device.

When the communications apparatus is a chip, the receiving unit may be an input unit such as an input circuit or a communications interface, and the transmitting unit may be an output unit such as an output circuit or a communications interface. When the communications apparatus is a device, the receiving unit may be a receiving device (or may be referred to as a receiver), and the transmitting unit may be a transmitting device (or may be referred to as a transmitter).

According to yet another aspect, a computer readable storage medium is provided. The computer readable storage medium stores an instruction, and when the instruction runs on a computer, the computer performs the methods in the foregoing aspects.

According to yet another aspect, a computer program product including an instruction is provided. When the instruction runs on a computer, the computer performs the methods in the foregoing aspects.

BRIEF DESCRIPTION OF DRAWINGS

To describe the technical solutions in the embodiments of the present invention or in the background more clearly, the following briefly describes the accompanying drawings required for describing the embodiments of the present invention or the background.

DESCRIPTION OF EMBODIMENTS

The following describes the embodiments of the present invention with reference to the accompanying drawings in the embodiments of the present invention.

Figure 1:
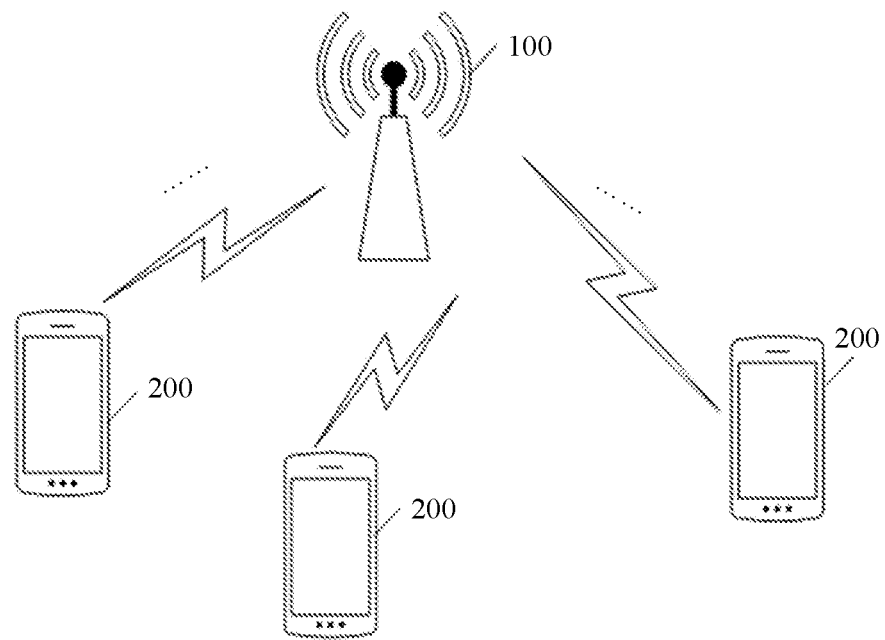
FIG. 1 is a schematic diagram of an example communications system according to an embodiment of the present invention.

FIG. 1 is a schematic diagram of an example communications system according to an embodiment of the present invention. The communications system may include at least one network device 100 (only one is shown) and one or more terminal devices 200 connected to the network device 100.

The network device 100 may be a device that can communicate with the terminal device 200. The network device 100 may be any type of device that has a wireless receiving/sending function. The network device 100 includes but is not limited to a base station (for example, a NodeB, an evolved NodeB (eNodeB), a base station in a fifth generation (5G) communications system, a base station or a network device in a future communications system, an access node in a Wi-Fi system, a radio relay node, or a wireless backhaul node) and the like. The network device 100 may alternatively be a radio controller in a cloud radio access network (CRAN) scenario. The network device 100 may alternatively be a network device in a 5G network or a network device in a future evolved network, or may be a wearable device, an in-vehicle device, or the like. The network device 100 may alternatively be a small cell, a transmission reference point (TRP), or the like. Certainly, in this application, the network device 100 is not limited thereto.

The terminal device 200 is a device that has a wireless receiving/sending function. The terminal device 200 may be deployed on land and includes an indoor or outdoor device, a hand-held device, a wearable device, or an in-vehicle device, may be deployed on a water surface (for example, a ship), or may be deployed in the air (for example, an airplane, a balloon, or a satellite). The terminal device may be a mobile phone, a tablet computer (Pad), a computer having a wireless transceiver function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. An application scenario is not limited in this embodiment of this application. The terminal device may sometimes be referred to as user equipment (UE), an access terminal device, a UE unit, a UE station, a mobile station, a mobile console, a remote station, a remote terminal device, a mobile device, a UE terminal device, a terminal device, a wireless communications device, a UE agent, a UE apparatus, or the like.

Figure 2:
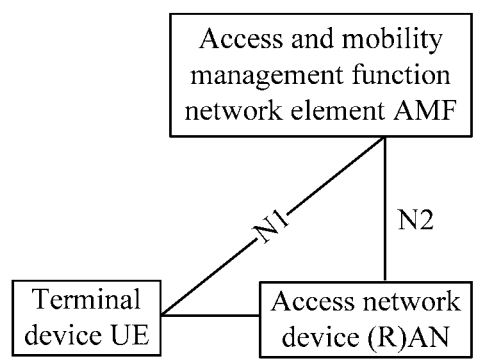
FIG. 2 is a schematic architectural diagram of an example next-generation communications system according to an embodiment of the present invention.

A next-generation communications system is used as an example. FIG. 2 is a schematic architectural diagram of an example next-generation communications system according to an embodiment of the present invention. In FIG. 2, in a the third generation partnership project, (3GPP) access mode, an access network device in FIG. 1 is referred to as a radio access network (RAN) network element. In a non-3GPP (N3G) access mode, an access network device is referred to as an access network (AN) network element or a non-3GPP interworking function (N3IWF) network element. The network device in FIG. 1 may be the access network device herein. The communications system further includes a core network device. The core network device includes an access management and mobility management function, which is referred to as an access and mobility management network element (AMF) in this application. The terminal device accesses a network by using the access network device, and the AMF is mainly responsible for access management and mobility management on the terminal device.

In FIG. 2, another functional entity may be further included, and only several functional entities in this application are described herein for emphasis. The entities are connected by using interfaces (for example, interfaces N1 and N2 in the figure). It may be understood that the core network device may further include a session management function, such as a session management function (SMF) entity or another function, and this is not limited herein.

Figure 3:
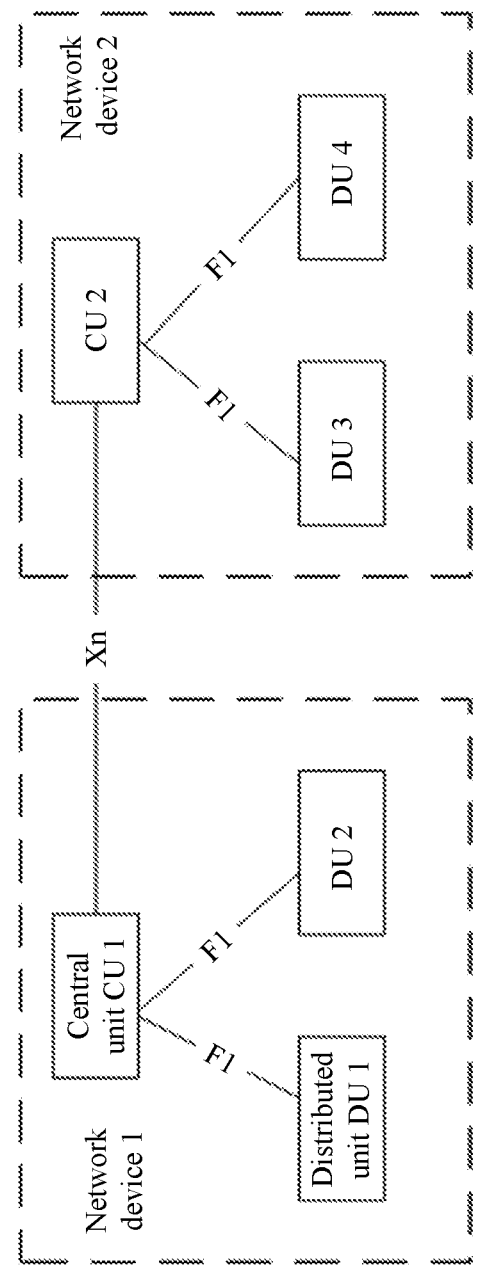
FIG. 3 is a schematic diagram of an example CU-DU architecture according to an embodiment of the present invention.

An architecture of the RAN device may be further divided. FIG. 3 is a schematic diagram of an example CU-DU architecture according to an embodiment of the present invention. A network device (for example, a base station) includes one CU, and one CU is connected to one or more DUs. The CU and the DU constitute a complete base station protocol stack function. For example, the CU includes a radio resource control (RRC) protocol stack function, a Packet Data Convergence Protocol (PDCP) protocol stack function, and an SDAP protocol stack function, and the DU includes a Radio Link Control (RLC) protocol stack function, a Media Access Control (MAC) protocol stack function, and a physical layer (PHY) protocol stack function. Certainly, the CU-DU architecture may alternative be another protocol stack distribution manner, and this is not specifically limited in this application. There is an interface between the CU and the DU. In this application, the interface is referred to as an F1 interface. However, a specific name is not limited. One DU may include one or more cells.

In this application, indication information of network slice may be represented by using at least one of the following parameters:

1. Network slice identifier. The network slice identifier may be specifically information listed in one or more of the following 1.1 to 1.7.

1.1. Network slice type information. The network slice type information may be used to indicate a network slice type such as an enhanced mobile broadband (eMBB) service, ultra-reliable and low latency communications (URLLC), or massive machine type communications (mMTC). Optionally, the network slice type information may further indicate an end-to-end network slice type, including a RAN-to-CN network slice type, or may indicate a (R)AN-side network slice type or a CN-side network slice type.

1.2. Service type information related to a specific service. The service type information may indicate a service feature such as a video service, an Internet of Vehicles service, or a voice service, or information about a specific service.

1.3. Tenant information used to indicate customer information used for creating or leasing the network slice. For example, a customer is Tencent or the State Grid Corporation of China.

1.4. User group information used to indicate group information used for grouping users according to a specific feature, for example, according to a user level.

1.5. Slice group information used to indicate that, for example, all network slices that can be accessed by UE may be used as a slice group according to a specific feature, or a group may be obtained by grouping network slices according to another criterion.

1.6. Network slice instance information used to indicate an identifier and feature information of an instance created for the network slice. For example, an identifier may be allocated to a network slice instance, to indicate the network slice instance; or a new identifier may be mapped based on a network slice instance identifier, to be associated with the network slice instance, so that a receiving party can identify, based on the identifier, a specific network slice instance indicated by the identifier.

1.7. Dedicated core network (DCN) identifier. The identifier is used to uniquely indicate a dedicated core network in an LTE system or an eLTE system, for example, a dedicated core network of the Internet of Things. Optionally, mapping may be performed between the DCN identifier and a network slice identifier, and the DCN identifier may be mapped to the network slice identifier, or the network slice identifier may be mapped to the DCN identifier.

It should be understood that if a network allows, in a registration area or a tracking area to which a source cell belongs, the UE to access a plurality of network slices, or for a specific public land mobile network (PLMN), a network allows, in a registration area or a tracking area to which a source cell belongs, the UE to access a plurality of network slices, an allowed network slice indication includes a plurality of allowed network slice identifiers.

2. Single network slice selection assistance information (S-NSSAI). The S-NSSAI includes at least slice/service type (SST) information, and optionally may further include slice differentiator (SD) information. The SST information is used to indicate behavior of a network slice, such as, a feature and a service type that are of the network slice. The SD information is SST supplementary information. If the SST corresponds to implementation of a plurality of network slices, the SD may correspond to a unique network slice instance.

It should be understood that if a network allows, in a registration area or a tracking area to which a source cell belongs, the UE to access a plurality of network slices, or for a specific public land mobile network (PLMN), a network allows, in a registration area or a tracking area to which a source cell belongs, the UE to access a plurality of network slices, the of indication allowed network slice includes a plurality of allowed S-NSSAI(s).

3. S-NSSAI group information used to indicate grouping performed according to a specific feature. For example, all network slices of a common AMF that are accessible to a UE may be used as an S-NSSAI group. NSSAI includes a plurality of S-NSSAI(s).

4. Temporary identifier (Temporary ID): The temporary identifier information is allocated by an AMF to UE that has been registered with a CN side, and the temporary ID may uniquely correspond to a specific AMF.

5. (Radio) access network-network slice selection assistance information ((R)AN-NSSAI, R-NSSAI): indicates a set of specific S-NSSAI, namely, a set of specific S-NSSAI. It should be understood that if a network allows, in a registration area or a tracking area to which a source cell belongs, the UE to access a plurality of network slices, or for a specific public land mobile network (PLMN), a network allows, in a registration area or a tracking area to which a source cell belongs, the UE to access a plurality of network slices, the indication of allowed network slice may include an identifier of a set of a plurality of allowed R-NSSAI(s).

6. Allowed NSSAI. The allowed NSSAI indicates NSSAI that a network allows a terminal device to access in a current registration area.

It should be understood that a specific encoding form of allowed indication information of network slice is not limited. Certainly, in addition to the foregoing identifiers, the network slice information may be another identifier, and this is not limited herein. If the network allows the UE to access a plurality of network slices, the allowed network slice indication may be a list form of allowed network slice indications, for example, an allowed network slice selection assistance information list (allowed NSSAI list), or an allowed single network slice selection assistance information list (allowed S-NSSAI list).

In this embodiment of this application, the network slice may use at least one of the foregoing parameters to represent the indication information of network slice. For example, the indication information of network slice may be represented by the network slice type, or may be represented by the network slice type and the service type, or may be represented by the service type and the tenant information. This is not limited in this embodiment of this application. How to represent indication information of network slice of a network slice is not described again below. It should be understood that, if the terminal device, the access network device, or the core network device supports a plurality of network slices, indication information of the network slices supported by the terminal device, the access network device, or the core network device may be embodied in a list form of the foregoing at least one identifier.

Because there are a plurality of types of services in the terminal device, such as an enhanced mobile broadband (eMBB) service, ultra-reliable and low latency communications (URLLC), and massive machine type communications (mMTC), and different types of service sessions may correspond to different network slices, even a same service type may correspond to different network slices due to different operators or service providers that provide the same service type. Different access network devices can support different network slices. In this way, when the terminal device needs to access the network and set up a plurality of sessions, a connected access network device needs to support network slices corresponding to all sessions or some sessions on the terminal device.

The embodiments of the present invention can be applied to another communications system that supports a network slice. The terms "system" and "network" can be interchanged with each other. The system architecture described in the embodiments of the present invention is intended to describe the technical solutions in the embodiments of the present invention more clearly, but does not constitute a limitation on the technical solutions provided in the embodiments of the present invention. A person of ordinary skill in the art may understand that the technical solutions provided in the embodiments of the present invention are also applicable to a similar technical problem as a network architecture evolves.

It should be noted that the terms "system" and "network" in the embodiments of the present invention may be used interchangeably. "A plurality of" means two or more, and in view of this, "a plurality of" may also be understood as "at least two" in the embodiments of the present invention. The term "and/or" describes an association relationship for describing associated objects and represents that three relationships may exist. For example, A and/or B may represent the following three cases: Only A exists, both A and B exist, and only B exists. In addition, the character "/" usually indicates an "or" relationship between the associated objects.

The embodiments of the present invention provide a communication method and a communications apparatus. Information of network slice supported by a distributed unit is exchanged between the distributed unit and a central unit by using a connection setup process, to implement a network slice-based service in a distributed unit and central unit architecture.

How a CU obtains information of network slice supported by a DU is specifically described below by using embodiments.

Figure 4A:
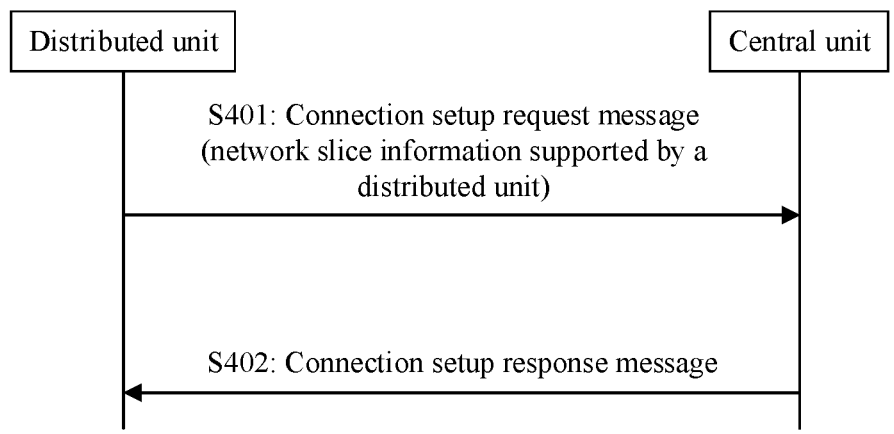
FIG. 4a is a schematic diagram of an interaction procedure of a communication method according to an embodiment of the present invention.

FIG. 4a is a schematic diagram of an interaction procedure of a communication method according to an embodiment of the present invention. The method may include the following steps:

S401: A distributed unit sends a connection setup request message to a central unit, and the central unit receives the connection setup request message from the distributed unit.

S402: The central unit sends a connection setup response message to the distributed unit, and the distributed unit receives the connection setup response message from the central unit.

In this embodiment, the connection setup request message includes information of network slice supported by the distributed unit. The connection setup request message may be an interface setup request message, and certainly may be another message for setting up connection. This is not limited herein.

In addition, the interface may be an F1 interface between the CU and the DU. Specifically, the DU sends an F1 interface setup request message (F1 setup request) to the CU. Certainly, a name of the interface is not limited.

The information of network slice supported by the distributed unit includes at least one combination of the following: Indication information of network slice supported by at least one cell of the distributed unit; a cell identifier of the at least one cell of the distributed unit and Indication information of network slice supported by each of the at least one cell; or an identifier of a tracking area or a registration area corresponding to the at least one cell of the distributed unit and Indication information of network slice supported by each tracking area or each registration area in the tracking area or the registration area corresponding to the at least one cell.

Optionally, the connection setup response message further includes information of network slice supported by the central unit.

Specifically, it is assumed that information of network slice supported by a cell of the DU is already configured for the DU, for example, an operation, administration and maintenance (OAM) system configures the information of network slice supported by the cell of the DU.

Figure 5:
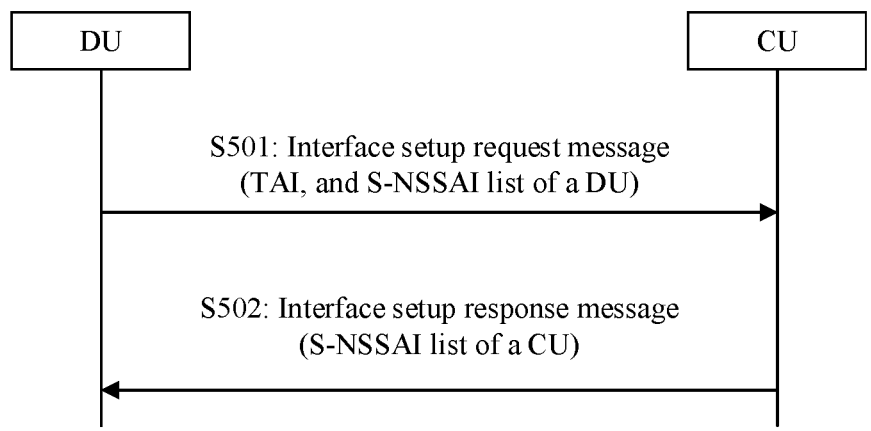
FIG. 5 is a schematic diagram of an interaction procedure of a communication method in a specific example.

FIG. 5 is a schematic diagram of specific network slice information transmission in an example. In FIG. 5, a DU and a CU can set up an interface for connection, for example, an F1 interface, and this is not limited herein. Information of network slice supported by the DU is exchanged when the interface is set up between the DU and the CU.

As shown in FIG. 5, the method includes the following steps.

S501: A DU sends an interface setup request message to a CU, and the CU receives the interface setup request message.

The request message includes indication information of network slice (which is S-NSSAI in FIG. 5) supported by the DU. In addition, the request message may further include a cell of the DU, or an identifier of a tracking area (tracking area identity/identifier, TAI) or a registration area identifier (registration area identity/identifier, RAI) to which the cell belongs. The identifier of the tracking area may also be referred to as a tracking area code (TAC), the registration area identifier may also be referred to as a registration area code (RAC), and names of the tracking area identifier and the registration area identifier are not limited. Alternatively, a public land mobile network (PLMN) identifier may be used when the TAC or the RAC is given.

Specifically, the information of network slice supported by the DU may be in the following three manners, but is not limited to the following three manners:

(a) The request message includes information of network slice supported by the DU.

| IE/Group Name | Explanation |
|---|---|
| Indication information of network slice supported by a DU | The Indication information of network slice supported by a DU is, for example, an S-NSSAI list or a single piece of S-NSSAI. |

(b) The request message includes information of network slice supported by a plurality of cells of the DU.

| IE/Group Name | Explanation |
|---|---|
| Cell identifier | The cell identifier may be a cell global identity (CGI), or may be a physical cell identifier (PCI) or another identifier. |

-continued

| IE/Group Name | Explanation |
| --- | --- |
| Indication information of network slice supported by each cell | The Indication information of network slice supported by each cell is, for example, an S-NSSAI list or a single piece of S-NSSAI. |

In this implementation, the request message may include an identifier of at least one cell of the DU and at least one piece of indication information of network slice corresponding to each cell identifier. One DU may include one or more cells, and each cell is identified by using a cell identifier. The cell identifier may uniquely identify a cell within a specific range. Each cell can support one or more network slices. Each cell supports a different network slice, and such a cell identifier may correspond to at least one piece of indication information of network slice.

(c) The request message includes a network slice supported by a TA/RA corresponding to a plurality of cells of the DU.

| IE/Group Name | Explanation |
| --- | --- |
| Tracking area identifier or registration area identifier | The Tracking area identifier or registration area identifier is a tracking area identifier (tracking area identity/identifier, TAI), a registration area identifier (registration area identity/identifier, RAI), a tracking area code (TAC), a registration area code (RAC), or a PLMN identifier. |
| Indication information of network slice supported by each TAI/RAI | The Indication information of network slice supported by each TAI/RAI is, for example, an S-NSSAI list or a single piece of S-NSSAI. |

In an implementation, information about the network slice supported by the DU may include at least one piece of indication information of network slice corresponding to a tracking area (TA) or a registration area (RA) to which a cell of the DU belongs. Each TA/RA can support one or more network slices, and such one piece of TA/RA information may correspond to at least one piece of indication information of network slice. The tracking area identifier or the tracking area code may uniquely identify a tracking area in a specific range, the registration area identifier or the registration area code may uniquely identify a registration area in a specific range. For example, if one piece of indication information of network slice is indicated by an S-NSSAI list, one TAI/RAI/TAC/RAC may correspond to one S-NSSAI list.

S502: The CU sends an interface setup response message to the DU, and the DU receives the interface setup response message. If a supported network slice is also configured for the CU, optionally, the CU further feeds back, in this message, information of network slice supported by the CU, to notify the DU of the information of network slice supported by the CU.

By using the foregoing interaction process, the DU notifies the CU of the supported network slice information, so that the CU checks whether the CU also supports the network slice supported by the DU.

It should be noted that if the CU does not support a network slice configured for the DU, this CU-DU architecture can support only the slice supported by the CU. In this case, if the DU needs to broadcast the network slice supported by the DU, each cell of the DU cannot broadcast the network slice configured for the DU, but only broadcasts a network slice configured by OAM for the DU and also supported by the CU.

In this embodiment, the information of network slice supported by the distributed unit is independently configured with flexibility for the distributed unit.

Figure 6:
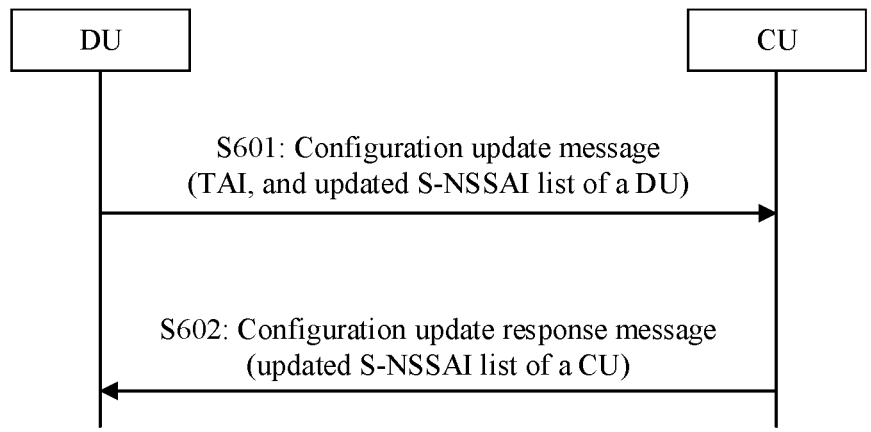
FIG. 6 is a schematic diagram of updating specific network slice information in an example.

Further, FIG. 6 is a schematic diagram of updating specific network slice information in an example. As shown in FIG. 6, when a network slice supported by a DU is updated, S601 is performed: The DU uses a configuration update message to send updated network slice information of the DU to a CU, and the CU receives the configuration update message from the DU. S602: The CU sends a configuration update response message to the DU. If a network slice supported by the CU is updated, the CU may also use the configuration update response message to send updated network slice information of the CU to the DU.

Figure 4B:
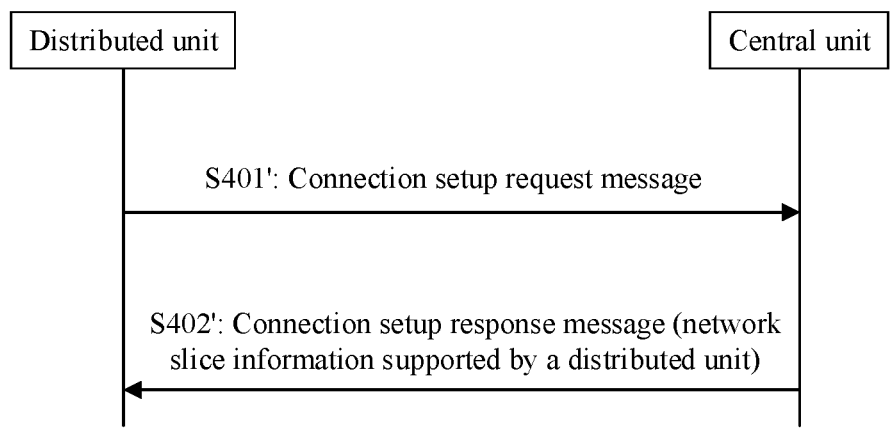
FIG. 4b is a schematic diagram of an interaction procedure of another communication method according to an embodiment of the present invention.

In an alternative embodiment of FIG. 4*a*, FIG. 4*b* is a schematic diagram of an interaction procedure of another communication method according to an embodiment of the present invention. The method may include the following steps:

S401': A distributed unit sends a connection setup request message to a central unit, and the central unit receives the connection setup request message from the distributed unit.

S402': The central unit sends a connection setup response message to the distributed unit, and the distributed unit receives the connection setup response message from the central unit.

Different from the embodiment shown in FIG. 4*a*, in the embodiment shown in FIG. 4*b*, the connection setup response message includes information of network slice supported by the distributed unit. In this way, the information of network slice supported by the DU may be controlled by the CU in a centralized manner, thereby reducing signaling overheads and simplifying operations.

Specifically, it is assumed that a network slice supported by each DU is configured for the CU, or information of network slice supported by all cells of the CU or TAs corresponding to all the cells is configured for the CU.

Figure 7:
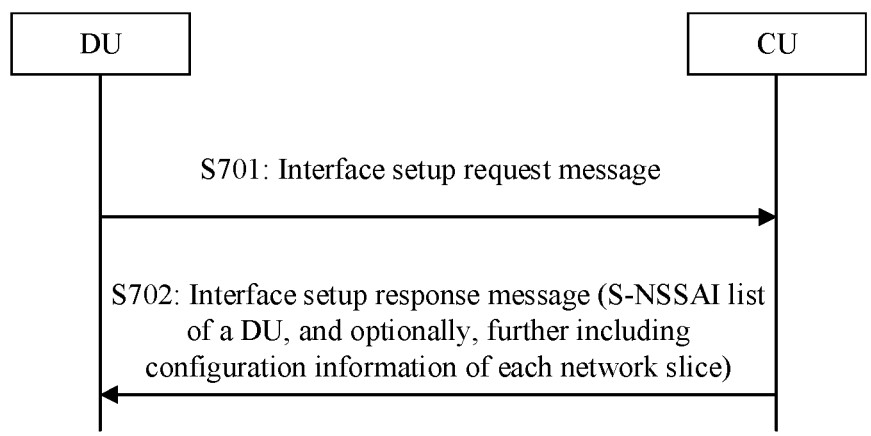
FIG. 7 is a schematic diagram of an interaction procedure of another communication method in a specific example.

FIG. 7 is a schematic diagram of an interaction procedure of another communication method in a specific example. The method may include the following steps.

S701: A DU sends an interface setup request message to a CU, and the CU receives the interface setup request message.

If cell information of the DU is configured for the DU, the request message may include a cell identifier (list) of the DU. The cell identifier may be a CGI, or may be a PCI.

S702: The CU sends an interface setup response message to the DU, and the DU receives the interface setup response message.

The response message includes at least one of the following: information of network slice supported by the DU, information of network slice supported by all cells of the DU, or network slices supported by TAs/RAs corresponding to all the cells of the DU. A specific format is shown in the foregoing three manners.

Optionally, the connection setup response message or a configuration update message may further include configuration information of each network slice. The configuration information includes at least one of the following: layer 1 (L1) protocol stack configuration information, layer 2 (L2) protocol stack configuration information, available physical resource information (such as a frequency band, a frequency, or a numerology), frequency band information (namely, a frequency band used by the network slice) corresponding to the network slice, frequency information (namely, a central frequency of a frequency band used by the network slice) corresponding to the network slice, supportable status information (including an idle state, a connected state, and an inactive state), or a KPI (key performance indicator, key performance indicator) parameter (such as a maximum bit rate, a latency requirement, a reliability requirement, or a quantity of supported MTC).

Figure 8:
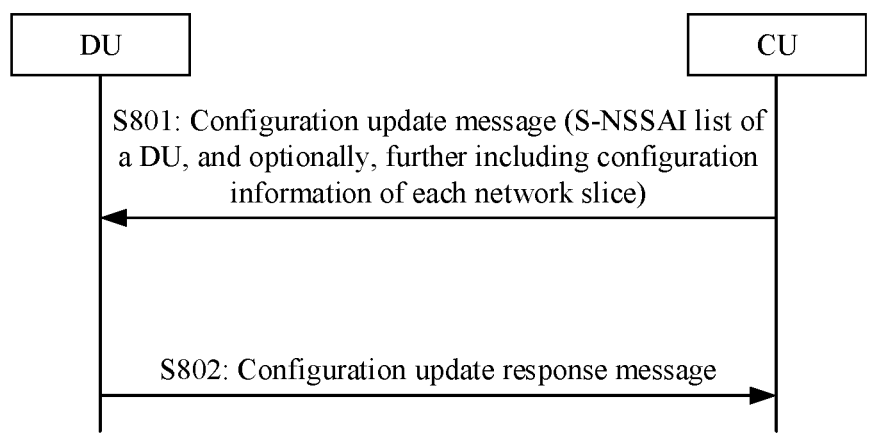
FIG. 8 is another schematic diagram of updating specific network slice information in an example.

Further, FIG. 8 is another schematic diagram of updating specific network slice information in an example. As shown in FIG. 8, when information of network slice supported by any cell of a CU is updated, S801 is performed: The CU uses a configuration update message to send network slice information, updated in CU, to a DU, and the DU receives the configuration update message from the CU. The configuration update message includes updated information of network slice supported by the central unit or the distributed unit. S802: The DU sends a configuration information response message to the CU.

It can be learned from the foregoing description that, in this application, after the information of network slice supported by the DU is exchanged between the DU and the CU by using a connection setup request message or a connection setup response message, the CU and the DU can provide a network slice-based service for a terminal device based on the information of network slice supported by the DU. Therefore, for example, the CU may notify a core network of a cell of the CU and the information of network slice supported by the CU, so that an AMF can allocate a corresponding TA or RA range to the terminal device. For another example, the CU may notify a neighboring base station of the information of network slice supported by the CU, to help the neighboring base station make a handover decision, for example, the neighboring base station may determine, based on whether the CU supports a network slice to which a terminal device currently of the CU belongs, whether to initiate a handover request to the CU. For another example, the CU may learn a network slice supported by the DU, so that the CU determines whether to initiate a corresponding session request message to the DU. For example, when dual connectivity needs to be configured for the terminal device, the terminal device reports a plurality of accessible DUs to the CU by using a measurement report, and the CU may determine, based on whether the DU supports a current network slice of the terminal device, whether to add the DU as a secondary RAN device (Secondary gNB) of the terminal device. Specifically, a DU 1 supports network slices 1 and 2, and a DU 2 supports network slices 2 and 3. During dual connectivity configuration, the measurement report reported by the terminal device to the CU shows that signal strength of the DU 1 is greater than signal strength of the DU 2, but a current session of the terminal device belongs to the network slice 3. Because the DU 1 does not support the network slice 3, although a signal of the DU 1 is strong, the CU still selects the DU 2 as the secondary RAN device of the terminal. Certainly, exchange of the information of network slice supported by the DU between the DU and the CU may also be used in another scenario.

According to the communication method provided in this embodiment of the present invention, the information of network slice supported by the distributed unit is exchanged between the distributed unit and the central unit by using a connection setup process, so that a network slice-based service in a distributed unit and central unit architecture can be implemented.

In the foregoing embodiment, the information of network slice supported by the distributed unit is exchanged between the distributed unit and the central unit by using a connection setup process, so that the DU and the CU can subsequently provide a network slice-based service for the terminal device. The network slice-based service is embodied in processes such as cell handover, terminal device state transition, and session setup.

Figure 9:
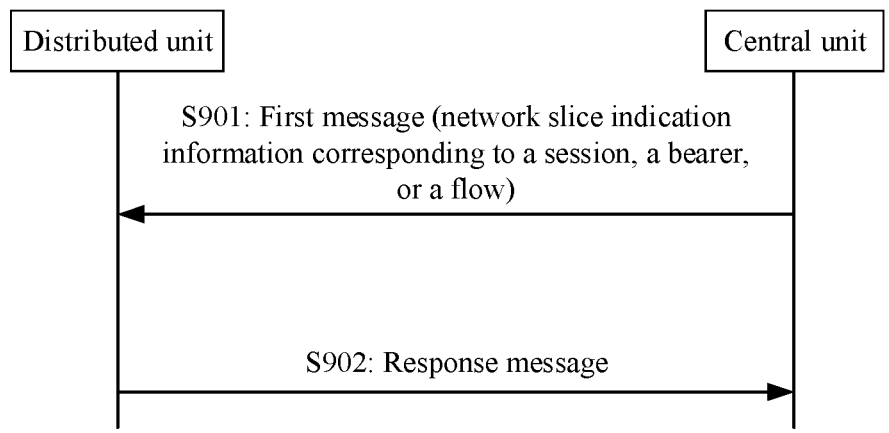
FIG. 9 is a schematic diagram of an interaction procedure of still another communication method according to an embodiment of the present invention.

FIG. 9 is a schematic diagram of an interaction procedure of still another communication method according to an embodiment of the present invention. The method may include the following steps.

S901: A central unit sends a first message to a distributed unit. The distributed unit receives the first message from the central unit. The first message includes indication information of network slice corresponding to a session, a bearer, or a flow.

The first message is used to request the distributed unit to establish or modify a session, establish or modify a bearer, or establish or modify a flow for a terminal device. The first message may be a session setup request message, a session modify request message, a bearer setup request message, a bearer modify request message, a flow setup request message, or a flow modify request message, or may be a UE context setup request message. It may be understood that a message name is not limited in this application.

S902: The distributed unit sends a response message to the central unit, and the central unit receives the response message from the distributed unit.

This embodiment may be based on that the distributed unit obtains supported network slice information.

A process of setting up the session, bearer, or flow may be a process of setting up a session, a bearer, or a flow when the terminal device accesses a network device for the first time, or a process of re-setting up a session, a bearer, or a flow after the terminal device performs handover, or may be a process of setting up a session, a bearer, or a flow of a new DU connected by the terminal device after a status of the terminal device changes (for example, from an inactive state to an active state). A process of setting up the session, bearer, or flow may be a process of modifying a session, a bearer, or a flow after the terminal device accesses a network device.

Optionally, the first message further includes an identifier of a session to be established or modified, an identifier of a bearer to be established or modified, or an identifier of a flow to be established or modified.

One session includes at least one bearer, and one bearer corresponds to at least one flow. Specifically, if the session request message is to establish or modify a session, the session request message includes an identifier of the session that needs to be established or modified, and a network slice corresponding to each session; if the session request message is to establish or modify a bearer, the session request message includes an identifier of the bearer that needs to be established or modified, and a network slice corresponding to a session to which each bearer or each bearer group belongs, and may further include a session identifier corresponding to the session to which each bearer or each bearer group belongs and a network slice corresponding to the session identifier; and if the session request message is to establish or modify a flow, the session request message includes an identifier of each flow and a network slice corresponding to a session to which each flow or each flow group belongs, and may further include a session identifier corresponding to the session to which each flow or each flow group belongs and a network slice corresponding to the session identifier.

Based on the foregoing description, the distributed unit obtains, from the session setup request message, indication information of network slice corresponding to a session, bearer, or flow to be established or modified, so that the distributed unit establishes or modifies the session, the bearer, or the flow on an indicated network slice, to conduct a session on a corresponding network slice, for example, configures a protocol stack parameter corresponding to the session or the bearer based on a network slice indicated by the indication information of network slice, and selects a proper physical transmission resource for the session or the bearer, for example, a numerology.

Further, after step S901 and before step S902, the method may further include the following step:

The distributed unit determines whether to support the network slice corresponding to the indication information of network slice.

To be specific, for the received indication information of network slice, the DU needs to determine, based on the network slice supported by the DU and obtained in the foregoing embodiment, whether the DU supports the network slice corresponding to the indication information of network slice. Specifically, the DU determines whether the network slice corresponding to the indication information of network slice is within a network slice range supported by the DU. If the DU does not support all network slices to which the session, the bearer, or the flow of the first message belongs, the DU may reject to establish or modify a session, a bearer, or a flow whose network slice is not supported by the DU, and notify, by using a response message, the CU of the session, the bearer, or the flow that the DU rejects to establish or modify. Optionally, the response message may further carry rejection cause indication information, to indicate that establishment or modification of the session, the bearer, or the flow is rejected because the DU does not support a network slice to which the session, the bearer, or the flow belongs.

A session, a bearer, or a flow may be established or modified between a CU and a DU. A process of setting up or modifying a session, a bearer, or a flow between the CU and the DU may also be a part of a PDU session setup process. The PDU session setup process is described in detail below.

Figure 10:
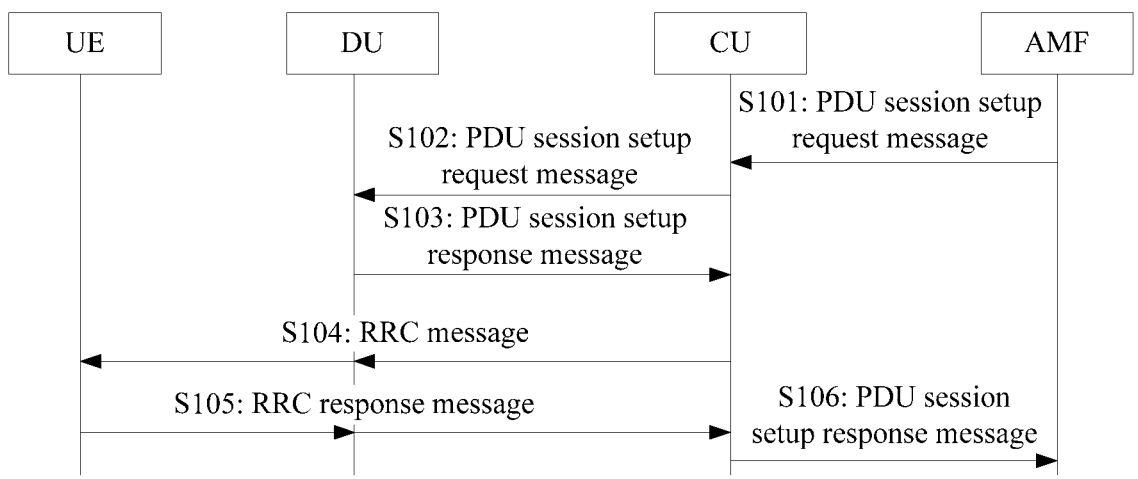
FIG. 10 is a schematic diagram of a PDU session setup procedure in an example.

FIG. 10 is a schematic diagram of a PDU session setup process. The session setup process may include the following steps.

Step S101: An AMF sends a PDU session setup request message to a CU.

The message includes identification information of a session that needs to be established/modified, identification information of a flow that needs to be established or modified in the session, and a QoS profile corresponding to each flow, such as a priority.

Step S102: The CU sends the PDU session setup request message to a DU, and the DU receives the PDU session setup request message.

In FIG. 10, the first message described above is specifically the PDU session setup request message herein. For details, refer to the description of S901 in the embodiment shown in FIG. 9.

Step S103: The DU sends a PDU session setup response message to the CU, and the CU receives the PDU session setup response message.

In FIG. 10, the response message described above is specifically the PDU session setup response message herein. For details, refer to the description of S902 in the embodiment shown in FIG. 9.

Step S104: The CU sends an RRC message to the DU. The DU transparently transmits the RRC message to UE, and the UE receives the RRC message.

Herein, the RRC message may be an RRC connection reconfiguration message, an RRC connection setup message, an RRC connection resume message, an RRC connection suspend message, or the like.

Step S105: The UE sends an RRC response message to the CU. The RRC response message may be forwarded by using the DU. The CU receives the RRC response message.

Step S106: The CU sends a session setup response message to the AMF.

An order of this step may be adjusted provided that this step is after step 103.

Optionally, the RRC message may include an identifier of a session that is successfully established. In another example, if S101 is to request to establish a bearer, the RRC message may include an identifier of a bearer that is successfully established; or if S101 is to request to set up a flow, the RRC message may include an identifier of a flow that is successfully established.

In the example in FIG. 10, a session setup process is described. In this example, after the DU sends the session setup response message to the CU, the CU sends the RRC message to a terminal device by using the DU. If this embodiment is used, an existing standard is changed slightly and a function of the DU does not need to be added.

Figure 11:
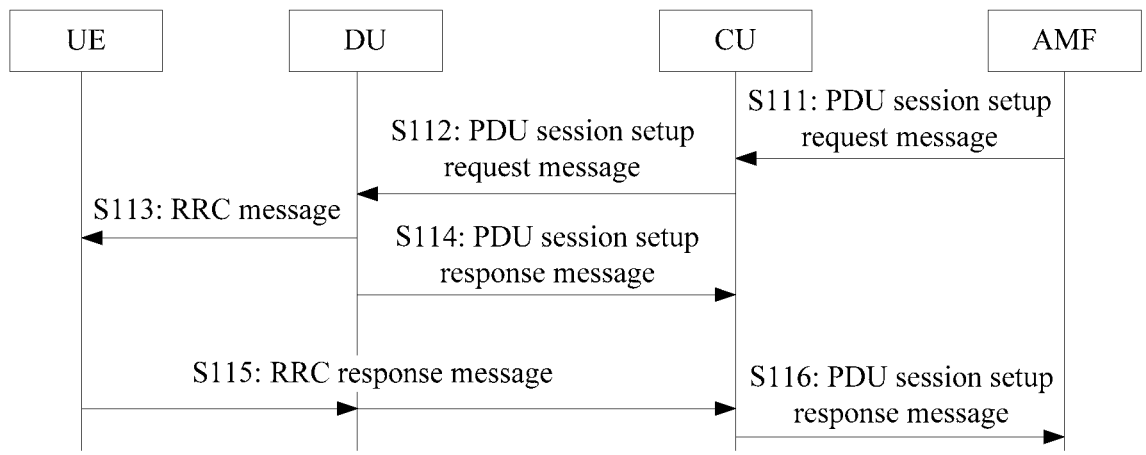
FIG. 11 is a schematic diagram of another PDU session setup procedure in an example.

FIG. 11 is a schematic diagram of another PDU session setup process. The session setup process may include the following steps.

Step S111: An AMF sends a PDU session request message to a CU.

The message includes identification information of a session that needs to be established/modified, identification information of a flow that needs to be established or modified in the session, and a QoS profile corresponding to each flow, such as a priority.

Step S112: The CU sends the PDU session setup request message to a DU. The DU receives the PDU session setup request message.

In FIG. 11, the first message described above is specifically the PDU session setup request message herein. For details, refer to the description of S901 in the embodiment shown in FIG. 9.

Step S113: The DU sends a radio resource control (RRC) message to a terminal device, and the terminal device receives the RRC message.

A difference from the foregoing example lies in that the DU can directly generate or modify the RRC message, and then directly send the RRC message to UE.

Step S114: The DU sends a PDU session setup response message to the CU, and the CU receives the PDU session setup response message.

In FIG. 11, the response message described above is specifically the PDU session setup response message herein. For details, refer to the description of S902 in the embodiment shown in FIG. 9.

Step S115: UE sends an RRC response message to the CU, where the RRC response message may be forwarded by using the DU.

Step S116: The CU sends a session setup response message to the AMF. This step may be any step after step S114.

Optionally, the RRC message may include an identifier of a session that is successfully established. In another example, if S111 is to request to establish a bearer, the RRC message may include an identifier of a bearer that is successfully established; or if S111 is to request to set up a flow, the RRC message may include an identifier of a flow that is successfully established.

In the example in FIG. 11, a complete session setup process is described. In this embodiment, the DU may directly generate the RRC message, so that the DU can send the RRC message to the terminal device more quickly without a need to send the RRC message back to the CU, thereby reducing a latency.

In an implementation, the first message or the response message further includes bearer duplication indication information. The bearer duplication indication information is used to indicate that duplication transmission configuration is performed on the session or the bearer.

Figure 12:
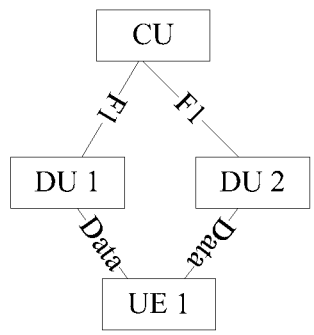
FIG. 12 is a schematic diagram of duplication transmission in an example.

As shown in FIG. 12, the replication transmission configuration means that the UE may simultaneously perform data transmission with two DUs or two cells of a DU. For example, the UE may perform data transmission with a DU 1 and a DU 2 at the same time. A specific process is as follows: For downlink data transmission, data from a core network is duplicated to obtain two same copies at a PDCP layer of the CU, one copy is transmitted to the DU 1 and is then transmitted to the UE by the DU 1, and the other copy is transmitted to the DU 2 and is then transmitted to the UE by the DU 2. For uplink data, the UE duplicates the data to obtain two same copies at a PDCP layer of the UE, transmits one copy to the DU 1, and transmits the other copy to the DU 2. In this implementation, the terminal device may transmit same data on two paths, thereby improving data transmission reliability. Data transmission succeeds provided that transmission on either of the two links succeeds. Whether the bearer duplication indication information is included in the first message or the response message depends on whether the duplication transmission configuration is performed by the CU or by the DU. For example, if the duplication transmission configuration is performed by the CU, the bearer duplication indication information is included in the first message. If the duplication transmission configuration is performed by the DU, the bearer duplication indication information is included in the response message.

In another implementation, the first message further includes distributed unit UE-aggregate maximum bit rate (DU UE-AMBR) indication information. The DU UE-AMBR indication information is used to indicate an aggregate maximum bit rate that can be provided by the distributed unit for the terminal device.

Specifically, if a network performs dual connectivity (DC) or multi-connectivity (MC) configuration for a bearer or a session of the UE, that is, the UE can perform data transmission with at least two DUs at the same time, a UE capability in the session setup request may optionally include a DU UE-AMBR. The CU obtains the DU UE-AMBR based on the UE-AMBR (the UE-AMBR may be obtained by the CU based on a received UE-AMBR from the core network, or may be obtained in another manner), the measurement report, a resource use status of the DU, and/or the like.

For example, if the UE can be served by two DUs (a DU 1 and a DU 2) at the same time, and it is assumed that the UE-AMBR is 90 (bps), and according to the measurement report, current spectral efficiency of the DU 1 is twice of current spectral efficiency of the DU 2, the CU learns that a DU 1 UE-AMBR and a DU 2 UE-AMBR are in a 2:1 relationship; to be specific, the DU 1 UE-AMBR is 60 (bps) and the DU 2 UE-AMBR is 30 (bps). For another example, the CU may also obtain, based on a current resource use status, that an AMBR that can be provided by the DU 1 for the UE is 20 (bps), and the CU determines that a DU 1 UE-AMBR is 20 (bps) and a DU 2 UE-AMBR is 70 (bps). Coordination of the CU prevents a case in which the UE-AMBR is exceeded due to independent scheduling of a target base station and a source base station (for example, the UE-AMBR is 50 bits, and if the DU does not know that the UE-AMBR is 50 bits, the DU 1 allocates 40 bits to the UE, that is, the DU 1 UE-AMBR is 40 bits, and the DU 2 allocates 20 bits to the UE, that is, the UDU 2 DU-AMBR is 20 bits; and eventually, a sum of the two is greater than 50 bits), thereby ensuring successful DC-based data transmission. It may be understood that the DU UE-AMBR may also be represented by another name, for example, a split UE-AMBR or a partial UE-AMBR, and this is not limited in this application.

It can be learned from the foregoing description that in this embodiment of the present invention, during session setup or modification, the central unit notifies the distributed unit of the indication information of network slice corresponding to the session, bearer, or flow to be established or modified, so that the distributed unit establishes or modifies the session, bearer, or flow on the indicated network slice, the distributed unit can accurately select a network slice and can configure, based on the network slice information corresponding to the session, an L1/L2 parameter corresponding to the network slice for the terminal device, and sessions corresponding to different network slices meet a specific QoS requirement. Therefore, different layer 1 or layer 2 configurations may be used for different network slices on a RAN side. For example, a bearer for a massive machine type communications (mMTC) network slice and a bearer for an ultra-reliable and low latency communications (URLLC) network slice may have different MAC layer configurations or RLC layer configurations (for example, RLC layer retransmission times are different) on the RAN side, or may have different PHY layer configurations (for example, different frequencies or numerologies are used, or different TTI lengths are used). During modification or setup of a session, a bearer, or a flow, a network slice to which a session, a bearer, or a flow that needs to be established or modified belongs is specified in this embodiment of the present invention. In this way, a UE side can pertinently configure RLC/MAC/PHY for the network slice to which the session, the bearer, or the flow belongs. If the network slice information is not carried, the DU cannot pertinently perform configuration, and consequently network performance is degraded. For example, a QoS requirement of the terminal device cannot be met, or a frequent radio link failure (for example, caused by improper configuration of RLC retransmission times) may be caused, thereby increasing signaling overheads.

According to the communication method provided in this embodiment of the present invention, the central unit notifies the distributed unit of the indication information of network slice corresponding to the session, bearer, or flow to be established or modified, so that the distributed unit establishes or modifies the session, the bearer, or the flow on the indicated network slice, and the distributed unit can accurately select a network slice, and perform corresponding configuration on the network slice to provide, for the terminal device, a network slice-based service that meets a requirement.

Figure 13:
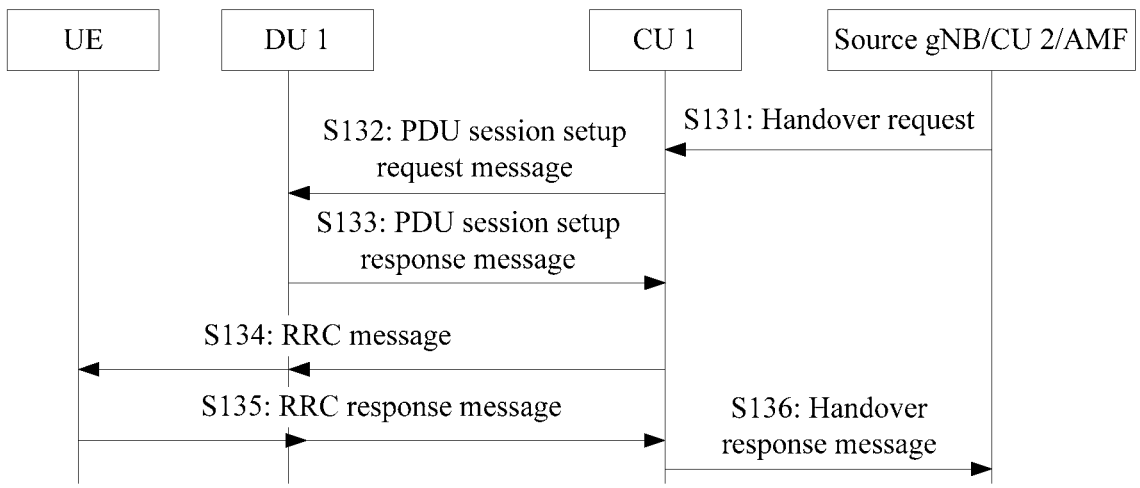
FIG. 13 is a schematic diagram of an interaction procedure of still another communication method according to an embodiment of the present invention.

FIG. 13 is a schematic diagram of an interaction procedure of still another communication method according to an embodiment of the present invention. The method includes the following steps.

S131: A source network device sends a handover request to a CU 1. The CU 1 receives the handover request.

The source network device may be a source gNB, a CU 2, or an AMF.

Optionally, the handover request includes configuration information of the source network device for at least one protocol stack corresponding to a bearer. The at least one protocol stack includes: an RLC protocol stack, a MAC protocol stack, or a PHY protocol stack.

S132: The CU 1 sends a first message to a DU 1. The DU 1 receives the first message from the central unit.

The first message includes indication information of network slice corresponding to a session, a bearer, or a flow. The first message further includes the configuration information of the source network device for the at least one protocol stack corresponding to the bearer.

S133: The DU 1 sends a response message to the CU 1. The CU 1 receives the response message from the DU 1.

In FIG. 13, the response message is a PDU session setup response message.

The first message is used to request a distributed unit to establish or modify a session, establish or modify a bearer, or establish or modify a flow for a terminal device. The first message may be a session setup request message, a session modify request message, a bearer setup request message, a bearer modify request message, a flow setup request message, or a flow modify request message, or may be a UE context setup request message. It may be understood that a message name is not limited in this application. In FIG. 13, a session setup request message is used as an example of the first message for description.

For a session setup process, refer to the description in the foregoing embodiment.

S134: The CU 1 sends a radio resource control message to UE by using the DU 1, where the RRC message is forwarded by a distributed unit. The UE receives the RRC message.

The RRC message includes an identifier of a session, bearer, or flow that is successfully established. The RRC message further includes configuration information for the at least one protocol stack obtained after the distributed unit performs differentiated configuration based on the configuration information of the source network device for the at least one protocol stack corresponding to the bearer, and the at least one protocol stack includes at least one of the following protocol stacks: an RLC protocol stack, a MAC protocol stack, or a PHY protocol stack.

S135: The UE sends an RRC response message to the CU 1 by using the DU 1. The CU 1 receives the RRC response message from the UE.

S136: The CU 1 sends a handover response message to the source network device. The source network device receives the handover response message from the CU 1.

In a handover scenario, the CU 1 and the DU 1 belong to a target base station, and the CU 1 receives the handover request message from the source network device (for example, an AMF, a gNB, or a CU 2). If the handover request message includes configuration information (may include configuration information of an RRC protocol stack, a PDCP protocol stack, or an SDAP protocol stack in the source network device) of the source network device for an RLC protocol stack, a MAC protocol stack, or a PHY protocol stack of a bearer of the terminal device, the session request message from the CU 1 to the DU 1 also carries the configuration information of the source network device for the RLC protocol stack, the MAC protocol stack, or the PHY protocol stack of the bearer of the terminal device. The protocol stack configuration information is used by the DU 1 for configuration reference, so that the DU 1 can perform differentiated configuration based on the configuration information.

For each bearer, there may be different RLC, MAC, or PHY parameter configurations. For example, for RLC, different bearers may use different transmission modes, including a transparent transmission mode or an acknowledged mode or an unacknowledged mode, or different maximum RLC retransmission times may be configured for different bearers. For MAC, different bearers may use different scheduling priorities. For PHY, different bearers may use different numerologies.

For example, in a handover scenario, PHY configuration and RLC configuration of a bearer 1 that needs to be handed over may be met at a PHY layer by using a numerology 1 and a numerology 2. On the source network device, the source network device configures the bearer on the numerology 1 to serve the bearer and configures maximum RLC layer retransmission times as five, and after receiving a configuration message of the source network device for the bearer 1, the DU 2 also configures maximum RLC retransmission times as five based on QoS requirement information and the like and with reference to configuration information of the source network device. However, for PHY layer configuration, the DU 1 is overloaded on the numerology 1, and therefore the DU 1 configures the bearer on the numerology 2 to serve the bearer. Therefore, the DU 1 performs differentiated configuration. To be specific, the DU 1 only needs to instruct the terminal device (or instruct the terminal device by using the CU) to modify PHY numerology configuration, and not to modify RLC retransmission times. In this way, a protocol stack configuration operation corresponding to the bearer of the DU 1 is simplified, and air interface resource overheads between the DU 1 and the terminal device are reduced.

In addition, in a state transition scenario of the terminal device, if the terminal device is currently in an inactive state, and the terminal device wants to resume a connected state or invoke an RNA updating procedure towards the CU 1, there are the following scenarios.

In a scenario, the terminal device moves from a network coverage area of the CU 2 or another gNB to a network coverage area of the CU 1, and the CU 1 first sends a context request message to the gNB or the CU 2. The context request message includes identification information of the terminal device. After receiving the context request message, the gNB or the CU 2 feeds back a context response message based on the identification information. The message includes configuration information of at least one of the RLC, MAC, or PHY protocol stack, configured by the gNB or the CU 2, of the bearer of the terminal device.

In another scenario, the terminal device performs state transition in a network coverage area of the CU 1, and the CU 1 stores the configuration information for the RLC, MAC, and PHY protocol stack of the bearer of the terminal device. In these two scenarios, a second message from the CU 1 to the DU 1 carries configuration information of the source network device for at least one or a combination of the RLC, MAC, and PHY protocol stack of the bearer of the terminal device. The protocol stack configuration information is used by the DU for configuration reference, so that the DU can perform differentiated configuration based on the configuration information. It may be understood that configuration information that is for the RLC, MAC, and PHY protocol stack of the bearer and that is carried in the second message from the CU 1 to the DU may also be configuration information stored by the CU 1 for the RLC, MAC, PHY protocol stack corresponding to the inactive terminal.

According to the communication method provided in this embodiment of the present invention, the central unit adds, to the first message to be sent to the distributed unit, configuration information of the source network device for a protocol stack corresponding to the bearer of the terminal device, so that the distributed unit can perform differentiated configuration on protocol stacks, thereby simplifying operations of the distributed unit.

Figure 14:
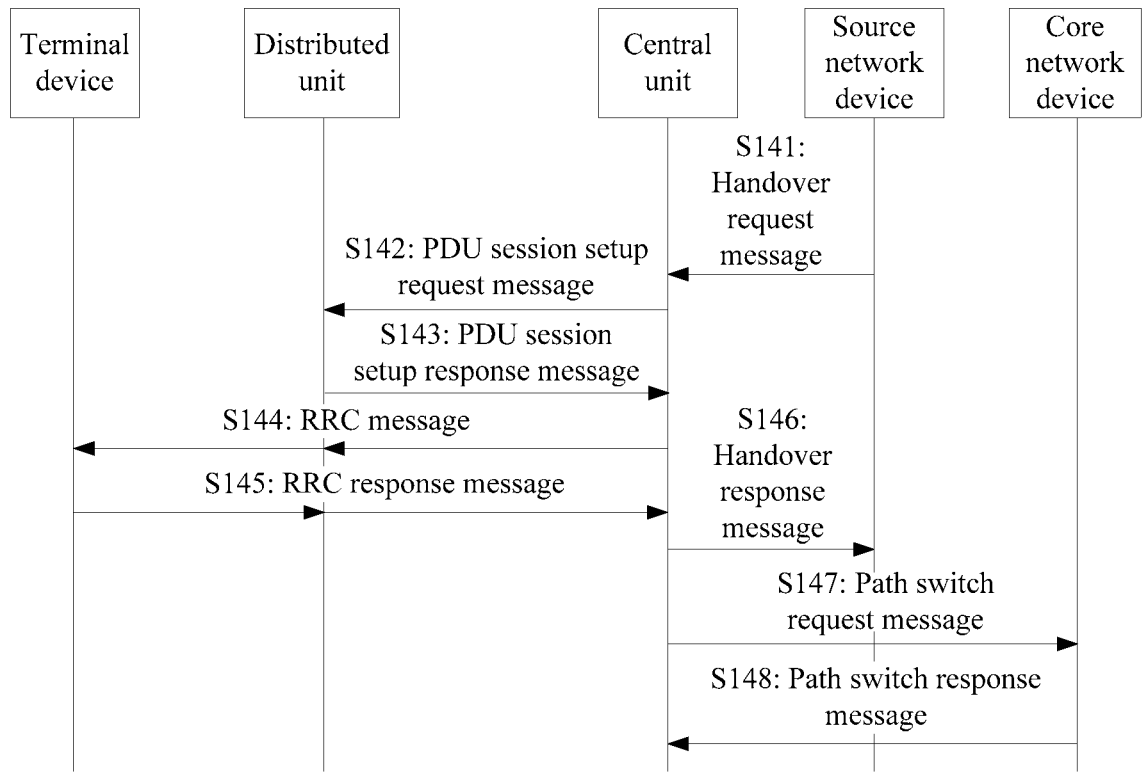
FIG. 14 is a schematic flowchart of still another communication method according to an embodiment of the present invention.

FIG. 14 is a schematic flowchart of still another communication method according to an embodiment of the present invention. Specifically, a schematic diagram of a session setup procedure during handover performed based on an interface (for example, an Xn interface) between network devices is provided. The method includes the following steps.

S141: A source network device sends a handover request message to a central unit, and the central unit receives the handover request message.

The source network device may be a source gNB, a CU 2, or an AMF.

S142: The central unit sends a first message to a distributed unit, and the distributed unit receives the first message from the central unit.

In FIG. 14, a PDU session setup request message is used as an example of the first message for description.

S143: The distributed unit sends a response message to the central unit, and the central unit receives the response message from the distributed unit.

In FIG. 14, the response message is a PDU session setup response message.

S144: The central unit sends a radio resource control message to UE by using the distributed unit, where the RRC message is forwarded by the distributed unit; and the UE receives the RRC message.

The RRC message includes an identifier of a session, bearer, or flow that is successfully established. The RRC message further includes configuration information for at least one protocol stack obtained after the distributed unit performs differentiated configuration based on configuration information of the source network device for at least one protocol stack corresponding to a bearer, and the at least one protocol stack includes at least one of the following protocol stacks: an RLC protocol stack, a MAC protocol stack, or a PHY protocol stack.

S145: The UE sends an RRC response message to the central unit by using the distributed unit, and the central unit receives the RRC response message from the UE.

S146: The central unit sends a handover response message to the source network device, and the source network device receives the handover response message from the central unit.

For S141 to S146, refer to corresponding description in the embodiment of FIG. 13. Details are not described herein again.

S147: The central unit sends a path switch request message to a core network device, and the central unit receives the path switch request message.

S148: The core network device sends a path switch response message to the central unit, and the source network device receives the path switch response message.

Due to mobility of the terminal device, the terminal device needs to move from an original serving central unit or distributed unit to a new central unit or distributed unit. In this scenario, the central unit notifies the core network device of a session or flow that requires path switch, so that the core network device can send downlink data and receive uplink data based on a switched path.

Specifically, when the central unit or the distributed unit performs access control, due to reasons such as resource limitation, the central unit or the distributed unit can accept only some sessions in a handover request, and support only some flows for an accepted session.

For example, the handover request message includes a P distributed unit session 1, a P distribution unit session 2, and a P distribution unit session 3. To be specific, the source network device requests to hand over the P distribution unit session 1, the P distribution unit session 2, and the P distribution unit session 3 of the terminal device to a central unit and a distributed unit of a target network device. The P distributed unit session 1 includes a flow 1, a flow 2, and a flow 3. The P distribution unit session 2 includes a flow 4, a flow 5, and a flow 6. The P distribution unit session 3 includes a flow 7, a flow 8, and a flow 9. However, due to reasons such as resource limitation, the central unit or the distributed unit allows only handover of the P distributed unit session 1 and the P distribution unit session 2, and accepts only handover of the flow 1 and the flow 2 for the P distributed unit session 1. In this case, the central unit needs to add, to the path switch request to be sent to the core network device, identification information of a P distributed unit session whose handover is accepted, and identification information of a corresponding accepted flow. In other words, in the path switch request from the central unit to the core network device, the core network device needs to be notified that the central unit accepts handover of the P distributed unit session 1 and the P distributed unit session 2, and for the P distributed unit session 1, only the flow 1 and the flow 2 can be handed over to the central unit or the distributed unit.

Optionally, the central unit may further add, to the path switch request to be sent to the core network device, identification information of a P distributed unit session whose handover is rejected. Optionally, the central unit may further add, to the path switch request to be sent to the core network device, identification information of a P distribution unit session whose handover is accepted, and identification information of a corresponding rejected flow, for example, an identifier of the P distributed unit session 1 and an identifier of the corresponding flow 3.

For example, the information carried in the path switch request message may be represented as:

| Session list requiring path switch |
| --- |
| >PDU session identifier (PDU Session ID)<br>>>Flow identifier/identifier list (flow ID (list)) |

It may be understood that the PDU session identifier and the flow identifier in the foregoing table may be transmitted by the central unit to the core network device as an application layer message (for example, an NGAP message), or may be transmitted to the core network device as a container, or may be transmitted to the core network device in another manner. This is not limited in this application.

After receiving the path switch request, the core network device performs a path switch operation, and sends a path switch response message to the central unit. The response message carries an identifier of a PDU session that requires uplink path switch. Optionally, the response message may further include an identifier, corresponding to the identifier of the PDU session that requires uplink path switch, of a flow that requires uplink path switch. This is because it is possible that only some flows are successfully switched for a specific session.

It may be understood that the flow in this specification may be a QoS flow, or may be a data flow, or may be a service flow, or may be a data packet, and this is not limited in this application.

According to the communication method provided in the embodiments of the present invention, the central unit notifies the core network device of a session or a flow that requires path switch, so that the core network device can send downlink data and receive uplink data based on a switched path.

The method in the embodiments of the present invention is described in detail above, and an apparatus in an embodiment of the present invention is provided below.

Figure 15:
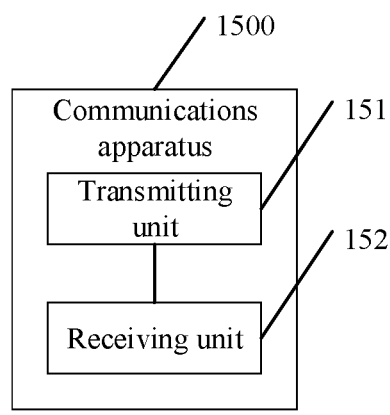
FIG. 15 is a schematic diagram of modules of a communications apparatus according to an embodiment of the present invention.

FIG. 15 is a schematic diagram of modules of a communications apparatus according to an embodiment of the present invention. The communications apparatus 1500 may include a transmitting unit 151 and a receiving unit 152.

The transmitting unit 151 is configured to send a connection setup request message to a central unit.

The receiving unit 152 is configured to receive a connection setup response message from the central unit.

The connection setup request message or the connection setup response message includes information of network slice supported by the distributed unit.

In an implementation, the connection setup response message further includes information of network slice supported by the central unit.

In another implementation, the transmitting unit is further configured to send a configuration update message to the central unit, where the configuration update message includes updated information of network slice supported by the distributed unit.

In still another implementation, the information of network slice supported by the distributed unit includes at least one of or a combination of the following: Indication information of network slice supported by at least one cell of the distributed unit; a cell identifier of the at least one cell of the distributed unit and Indication information of network slice supported by each of the at least one cell; or an identifier of a tracking area or a registration area corresponding to the at least one cell of the distributed unit and Indication information of network slice supported by each tracking area or each registration area in the tracking area or the registration area corresponding to the at least one cell.

According to the communications apparatus provided in this embodiment of the present invention, the information of network slice supported by the distributed unit is exchanged between the distributed unit and the central unit by using a connection setup process, so that a network slice-based service in a distributed unit and central unit architecture can be implemented.

Figure 16:
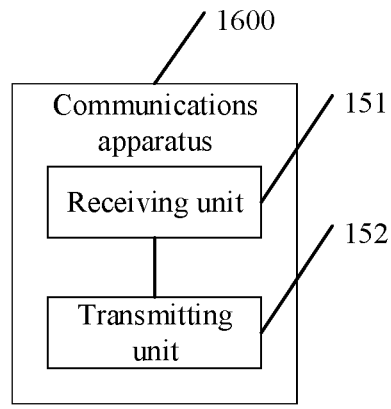
FIG. 16 is a schematic diagram of modules of another communications apparatus according to an embodiment of the present invention.

FIG. 16 is a schematic diagram of modules of another communications apparatus according to an embodiment of the present invention. The communications apparatus 1600 may include a receiving unit 161 and a transmitting unit 162.

The receiving unit 161 is configured to receive a connection setup request message from a distributed unit.

The transmitting unit 162 is configured to send a connection setup response message to the distributed unit.

The connection setup request message or the connection setup response message includes information of network slice supported by the distributed unit.

In an implementation, the connection setup response message further includes information of network slice supported by the central unit.

In another implementation, the transmitting unit is further configured to send a configuration update message to the distributed unit, where the configuration update message includes updated information of network slice supported by the central unit.

In still another implementation, the configuration update message or the connection setup response message further includes network slice configuration information. The network slice configuration information includes at least one of the following configuration information: layer 1 protocol stack configuration information, layer 2 protocol stack configuration information, physical resource information, frequency band information corresponding to a network slice, frequency information corresponding to a network slice, or status information supported by a network slice.

According to the communications apparatus provided in this embodiment of the present invention, the information of network slice supported by the distributed unit is exchanged between the central unit and the distributed unit by using a connection setup process, so that a network slice-based service in a distributed unit and central unit architecture can be implemented.

Figure 17:
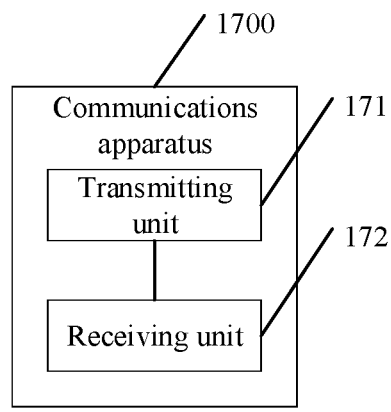
FIG. 17 is a schematic diagram of modules of still another communications apparatus according to an embodiment of the present invention.

FIG. 17 is a schematic diagram of modules of still another communications apparatus according to an embodiment of the present invention. The communications apparatus 1700 may include a transmitting unit 171 and a receiving unit 172.

The transmitting unit 171 is configured to send a first message to a distributed unit, where the first message includes indication information of network slice corresponding to a session, a bearer, or a flow.

The receiving unit 172 is configured to receive a response message from the distributed unit.

In an implementation, the transmitting unit 171 is further configured to send a radio resource control message to a terminal device by using the distributed unit, where the radio resource control message includes an identifier of a session, bearer, or flow that is successfully established.

In another implementation, the transmitting unit 171 is further configured to send a path switch request message to a core network device, where the path switch request message includes an identifier of a session successfully established by the central unit or the distributed unit, and/or an identifier of a flow that corresponds to the session identifier and that is successfully established by the central unit or the distributed unit.

In still another implementation, the first message or the response message further includes bearer duplication indication information.

In yet another implementation, the first message further includes DU UE-AMBR indication information, and the DU UE-AMBR indication information is used to indicate an aggregate maximum bit rate enforced by the distributed unit for the terminal device.

In yet another implementation, the first message further includes configuration information of a source network device for at least one protocol stack corresponding to a bearer, and the at least one protocol stack includes an RLC protocol stack, a MAC protocol stack, and a PHY protocol stack.

In yet another implementation, the source network device includes any one of the following: the central unit, a source base station, a source central unit, and the core network device.

According to the communications apparatus provided in this embodiment of the present invention, because different network slices have different layer 1 or layer 2 configurations on a RAN side, different sessions may correspond to different network slices. During session setup or modification, the central unit notifies the distributed unit of indication information of network slice corresponding to a session, bearer, or flow to be established or modified, and the distributed unit establishes or modifies the session, bearer, or flow on an indicated network slice, so that the distributed unit can accurately select a network slice, and can configure, based on the network slice information corresponding to the session, an L1/L2 parameter corresponding to the network slice for the terminal device. Therefore, sessions that belong to different network slices meet a specific QoS requirement.

Figure 18:
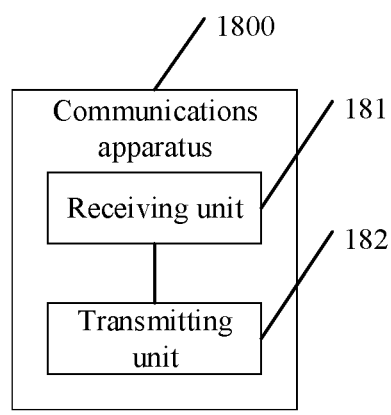
FIG. 18 is a schematic diagram of modules of still another communications apparatus according to an embodiment of the present invention.

FIG. 18 is a schematic diagram of modules of still another communications apparatus according to an embodiment of the present invention. The communications apparatus 1800 may include a receiving unit 181 and a transmitting unit 182, and may further include a processing unit 183.

The receiving unit 181 is configured to receive a first message from a central unit, where the first message includes indication information of network slice corresponding to a session, a bearer, or a flow.

The transmitting unit 182 is configured to send a response message to the central unit.

In an implementation, the transmitting unit 182 is further configured to send a radio resource control message from the central unit to a terminal device, where the radio resource control message includes an identifier of a session, bearer, or flow that is successfully established.

In another implementation, the communications apparatus 1800 further includes a processing unit 183, configured to determine whether the communications apparatus supports a network slice corresponding to the indication information of network slice.

In still another implementation, the first message or the response message further includes bearer duplication indication information.

In yet another implementation, the first message further includes DU UE-AMBR indication information, and the DU UE-AMBR indication information is used to indicate an aggregate maximum bit rate enforced by the distributed unit for the terminal device.

In yet another implementation, the first message further includes configuration information of a source network device for at least one protocol stack corresponding to a bearer, and the at least one protocol stack includes an RLC protocol stack, a MAC protocol stack, and a PHY protocol stack.

In yet another implementation, the source network device includes any one of the following: the central unit, a source base station, a source central unit, and the core network device.

According to the communications apparatus provided in this embodiment of the present invention, because different network slices have different layer 1 or layer 2 configurations on a RAN side, different sessions may correspond to different network slices. During session setup or modification, the central unit notifies the distributed unit of indication information of network slice corresponding to a session, bearer, or flow to be established or modified, and the distributed unit establishes or modifies the session, bearer, or flow on an indicated network slice, so that the distributed unit can accurately select a network slice, and can configure, based on the network slice information corresponding to the session, an L1/L2 parameter corresponding to the network slice for the terminal device. Therefore, sessions that belong to different network slices meet a specific QoS requirement.

An embodiment of the present invention further provides a communications apparatus. The communications apparatus may be a distributed unit in the foregoing communications system, and the communications apparatus may use a hardware architecture shown in FIG. 19. The communications apparatus may include a receiver, a transmitter, a memory, and a processor, and the receiver, the transmitter, the memory, and the processor are connected to each other by using a bus. Related functions implemented by the receiving unit 152 in FIG. 15 may be implemented by the receiver, and related functions implemented by the transmitting unit 151 may be implemented by the transmitter. Related functions implemented by the receiving unit 181 in FIG. 18 may be implemented by the receiver, related functions implemented by the transmitting unit 182 may be implemented by the transmitter, and related functions implemented by the processing unit 183 may be implemented by using one or more processors.

The memory includes but is not limited to a random access memory (RAM), a read-only memory (ROM), an erasable programmable read only memory (EPROM), or a compact disc read-only memory (CD-ROM), and the memory is configured to store related instructions and data.

The receiver is configured to receive data and/or a signal, and the transmitter is configured to send data and/or a signal. The transmitter and the receiver may be independent components, or may be a whole component.

The processor may include one or more processors, for example, include one or more central processing units (CPU). When the processor is a CPU, the CPU is a single-core CPU, or may be a multi-core CPU.

The memory is configured to store program code and data of a network device.

In an implementation, the transmitter is configured to send a connection setup request message to a central unit, for example, perform step S401 in the embodiment shown in FIG. 4, and the receiver is configured to receive a connection setup response message from the central unit, for example, perform step S402 in the embodiment shown in FIG. 4.

In another implementation, the receiver is configured to receive a first message from a central unit, for example, perform step S901 in the embodiment shown in FIG. 9, and the transmitter is configured to send a response message to the central unit, for example, perform step S902 in the embodiment shown in FIG. 9.

For details, refer to description in the foregoing method embodiments. Details are not described herein again.

Figure 19:
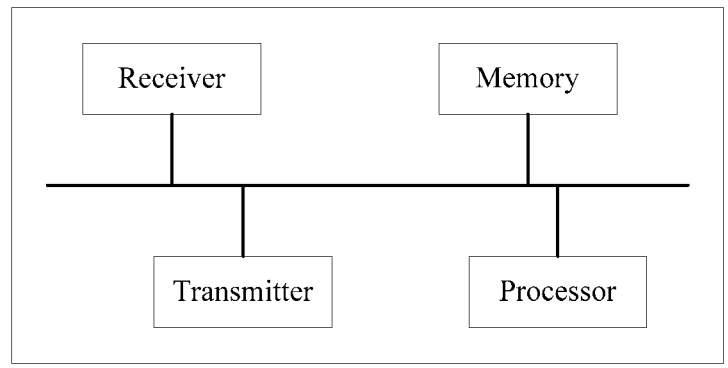
FIG. 19 is a schematic diagram of a hardware architecture of a communications apparatus according to an embodiment of the present invention.

It may be understood that FIG. 19 shows only a simplified design of the communications apparatus. In actual application, the communications apparatus may further include other necessary elements, including but not limited to any quantities of transceivers, processors, controllers, memories, and the like, and all communications apparatuses that can implement the embodiments of the present invention fall within the protection scope of the present invention.

An embodiment of the present invention further provides a communications apparatus. The communications apparatus may be a central unit in the foregoing communications system, and the communications apparatus may use a hardware architecture shown in FIG. 19. The communications apparatus may include a receiver, a transmitter, a memory, and a processor, and the receiver, the transmitter, the memory, and the processor are connected to each other by using a bus. Related functions implemented by the receiving unit 161 in FIG. 16 may be implemented by the receiver, and related functions implemented by the transmitting unit 162 may be implemented by the transmitter. Related functions implemented by the receiving unit 172 in FIG. 17 may be implemented by the receiver, and related functions implemented by the transmitting unit 171 may be implemented by the transmitter.

The memory includes but is not limited to a random access memory (RAM), a read-only memory (ROM), an erasable programmable read only memory (EPROM), or a compact disc read-only memory (CD-ROM), and the memory is configured to store related instructions and data.

The receiver is configured to receive data and/or a signal, and the transmitter is configured to send data and/or a signal. The transmitter and the receiver may be independent components, or may be a whole component.

The processor may include one or more processors, for example, include one or more central processing units (CPU). When the processor is a CPU, the CPU is a single-core CPU, or may be a multi-core CPU.

The memory is configured to store program code and data of a network device.

In an implementation, the receiver is configured to receive a connection setup request message from a distributed unit, for example, perform step S401 in the embodiment shown in FIG. 4, and the transmitter is configured to send a connection setup response message to the distributed unit, for example, perform step S402 in the embodiment shown in FIG. 4.

In another implementation, the transmitter is configured to send a first message to a distributed unit, for example, perform step S901 in the embodiment shown in FIG. 9, and the receiver is configured to receive a response message from the distributed unit, for example, perform step S902 in the embodiment shown in FIG. 9.

For details, refer to description in the foregoing method embodiments. Details are not described herein again.

It may be understood that FIG. 19 shows only a simplified design of the communications apparatus. In actual application, the communications apparatus may further include other necessary elements, including but not limited to any quantities of transceivers, processors, controllers, memories, and the like, and all communications apparatuses that can implement the embodiments of the present invention fall within the protection scope of the present invention.

An embodiment of the present invention further provides a communications system, including the foregoing communications apparatuses.

Figure 20:
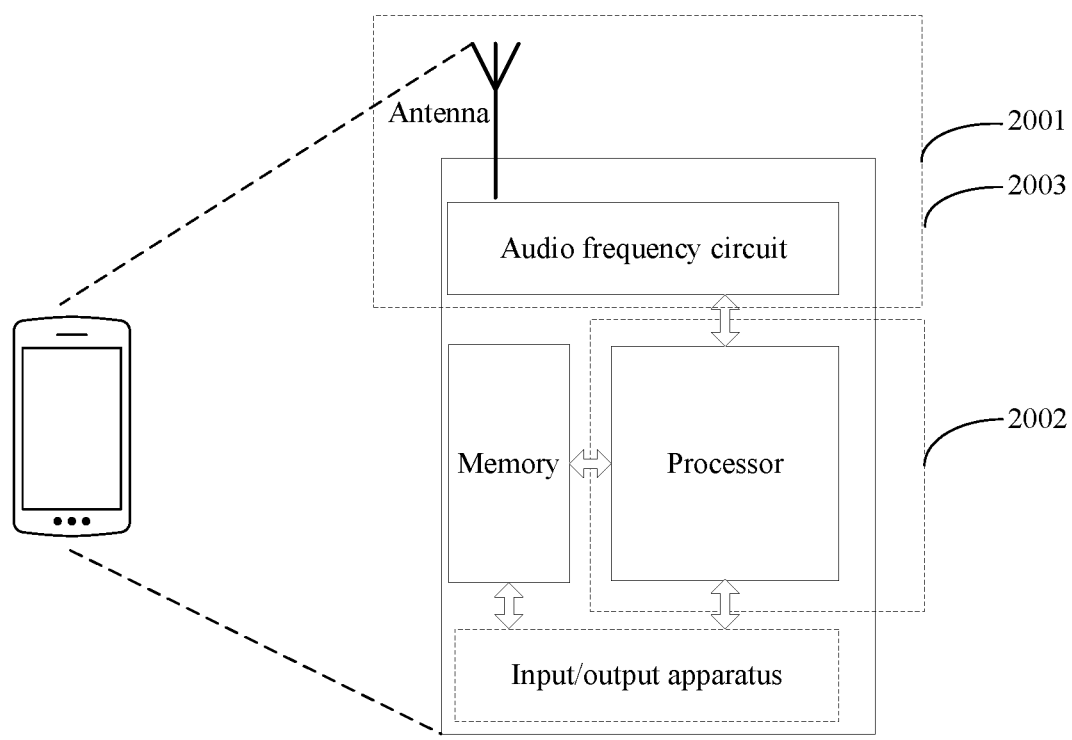
FIG. 20 is a schematic structural diagram of a simplified terminal device.

FIG. 20 is a schematic structural diagram of a simplified terminal device. For ease of understanding and convenience of illustration, in FIG. 20, a mobile phone is used as an example of the terminal device. As shown in FIG. 20, the terminal device includes a processor, a memory, a radio frequency circuit, an antenna, and an input/output apparatus. The processor is mainly configured to: process a communications protocol and communication data, and control the terminal device, to execute a software program, process data of the software program, and the like. The memory is configured to store a software program and data. The radio frequency circuit is mainly used for conversion between a baseband signal and a radio frequency signal and processing of the radio frequency signal. The antenna is mainly configured to receive and transmit a radio frequency signal in an electromagnetic wave form. The input/output apparatus such as a touchscreen, a display, or a keyboard is mainly configured to receive data input by a user and output data to the user. It should be noted that some types of terminal devices may not have an input/output apparatus.

When data needs to be sent, the processor performs baseband processing on the to-be-sent data, and outputs a baseband signal to the radio frequency circuit. After performing radio frequency processing on the baseband signal, the radio frequency circuit sends the radio frequency signal by using the antenna in a form of an electromagnetic wave. When data is sent to the terminal device, the radio frequency circuit receives the radio frequency signal by using the antenna, converts the radio frequency signal into a baseband signal, and outputs the baseband signal to the processor, and the processor converts the baseband signal into data and processes the data. For ease of description, FIG. 20 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have a receiving/sending function may be considered as a receiving unit and a transmitting unit (or may be collectively referred to as a transceiver) of the terminal device, and the processor that has a processing function may be considered as a processing unit of the terminal device. As shown in FIG. 20, the terminal device includes a receiving unit 2001, a processing unit 2002, and a transmitting unit 2003. The receiving unit 2001 may also be referred to as a receiving device, a receiver, a receiver circuit, or the like, and the transmitting unit 2003 may also be referred to as a transmitting device, a transmitter, a transmitter circuit, or the like. The processing unit may also be referred to as a processor, a processing board, a processing module, a processing apparatus, or the like.

For example, in an embodiment, the receiving unit 2001 is configured to receive a radio resource control message, for example, perform S104 in the embodiment shown in FIG. 10, S113 in the embodiment shown in FIG. 11, or S135 in the embodiment shown in FIG. 13. The transmitting unit 2003 sends a radio resource response message to a central unit, for example, performs S105 in the embodiment shown in FIG. 10, S115 in the embodiment shown in FIG. 11, or S136 in the embodiment shown in FIG. 13.

According to the terminal device provided in this embodiment of the present invention, the terminal device obtains an identifier of a session, bearer, or flow that is successfully established, to conduct a session with a network device.

An embodiment of the present invention further provides a computer readable storage medium. The computer readable storage medium stores an instruction, and when the instruction runs on a computer, the computer performs the methods in the foregoing aspects.

An embodiment of the present invention further provides a computer program product including an instruction. When the instruction runs on a computer, the computer performs the methods in the foregoing aspects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the specification, claims, and accompanying drawings of this application, the terms "first", "second", "third", "fourth", and so on are intended to distinguish between different objects but do not indicate a particular order. In addition, the terms "including" and "having" and any other variants thereof are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

A person of ordinary skill in the art may understand that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instruction may be stored in a computer-readable storage medium, or may be transmitted by using the computer-readable storage medium. The computer instruction may be transmitted from one website site, computer, server or data center to another network site, computer, server or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium includes: any medium that can store program code, such as a read-only memory (ROM), a random access memory ( ), a magnetic disk, or an optical disc.

What is claimed is:

1. A communication method in a wireless communication system that comprises a central unit (CU) and a plurality of distributed units (DUs), the method comprising:

receiving, by a CU of a radio access network (RAN), an indication of a user equipment- aggregate maximum bit rate (UE-AMBR) from a core network device;

allocating, by the CU, a first portion of the UE-AMBR as a first DU UE-AMBR and a second portion of the UE-AMBR as a second DU UE-AMBR, wherein the first DU UE-AMBR indicates an aggregate maximum bit rate to be enforced by a first DU of the RAN for a terminal device, and the second DU UE-AMBR indicates an aggregate maximum bit rate to be enforced by a second DU of the RAN for the terminal device;

sending, by the CU, to the first DU a first UE context setup request message, wherein the first UE context setup request message comprises an identifier of a first bearer to be established, and indication information of a network slice corresponding to the first bearer, and first indication information indicating the first DU UE-AMBR;

sending, by the CU, to the second DU, a second UE context setup request message, wherein the second UE context setup request message comprises an identifier of a second bearer to be established, and indication information of a network slice corresponding to the second bearer, and second indication information indicating the second DU UE-AMBR;

sending, by the first DU to the CU, a first response message in response to the first UE context setup request message; and sending, by the second DU to the CU, a second response message in response to the second UE context setup request message.

2. The method according to claim 1, wherein the method further comprises:

sending, by the CU, a radio resource control (RRC) message to the first DU;

sending, by the first DU, the RRC message to the terminal device, wherein the RRC message comprises an identifier of a successfully established session and an identifier of a successfully established bearer;

receiving, by the first DU, an RRC response message from the terminal device; and sending, by the first DU, the RRC response message to the CU.

3. The method according to claim 2, wherein the RRC message is an RRC connection reconfiguration message.

4. The method according to claim 1, further comprising:
sending, by the first DU, a connection setup request message to the CU, wherein the connection setup request message comprises information of network slice supported by the first DU of the RAN; and
sending, by the CU, a connection setup response message to the first DU.

5. The method according to claim 4, wherein the information of network slice supported by the first DU comprises: an identifier of a tracking area corresponding to at least one cell of the first DU and indication information of network slice supported by the tracking area.

6. The method according to claim 4, wherein the connection setup request message is a F1 setup request message.

7. The method according to claim 4, wherein the connection setup request message further comprises a cell identifier of the first DU, and the cell identifier is a cell global ID (CGI), or a physical cell identifier (PCI).

8. The method according to claim 1, further comprising:
sending, by the first DU, a configuration update message to the CU, wherein the configuration update message comprises updated information of network slice supported by the first DU; and
sending, by the CU, a configuration update response message to the first DU.

9. The method according to claim 1, wherein the indication information of the network slice comprises single network slice selection assistance information (S-NSSAI), and the S-NSSAI comprises slice/service type.

10. The method according to claim 1, further comprising:
sending, by a source network device, a handover request message to the CU; sending, by the CU, a handover request response message to the source network device; and
wherein the source network device comprises one of a source radio access network device, a source access and mobility management network element, or a source CU.

11. The method according to claim 10, wherein the UE context setup request message further comprises configuration information of the source network device for at least one protocol stack corresponding to the bearer.

12. The method according to claim 11, wherein the at least one protocol stack comprises at least one of: a Radio Link Control (RLC) protocol stack, a Media Access Control (MAC) protocol stack, or a physical layer (PHY) protocol stack.

13. The method according to claim 10, further comprising:
sending, by the CU, a path switch request message to a core network device, wherein the path switch request message comprises an identifier of a session successfully established by the CU, or an identifier of a flow that corresponds to a session that is successfully established by the CU; and
sending, by the core network device, a path switch response message to the CU.

14. The method according to claim 1, wherein the CU comprises an RRC protocol stack function, a Packet Data Convergence Protocol (PDCP) protocol stack function, and an SDAP protocol stack function; and
the first DU comprises an RLC protocol stack function, a MAC protocol stack function, and a PHY protocol stack function.

15. The method according to claim 1, further comprising:
configuring, by an operation, administration and maintenance (OAM) system, the indication information of the network slice supported by the first DU.

16. A wireless communication system, comprising:
a central unit (CU) of a radio access network (RAN), a first distributed unit (DU) and a second DU in a plurality of DUs of the RAN;
the CU comprises:
at least one processor; and
a non-transitory computer-readable storage medium coupled to the at least one processor and storing programming instructions for execution by the at least one processor, the programming instructions instruct the at least one processor to:
receive an indication of a user equipment-aggregate maximum bit rate (UE-AMBR) from a core network device;
allocate a first portion of the UE-AMBR as a first DU UE-AMBR and a second portion of the UE-AMBR as a second DU UE-AMBR, wherein the first DU UE-AMBR indicates an aggregate maximum bit rate to be enforced by a first DU of the RAN for a terminal device, and the second DU UE-AMBR indicates an aggregate maximum bit rate to be enforced by a second DU of the RAN for the terminal device;
send, to the first DU, a first UE context setup request message, wherein the first UE context setup request message comprises an identifier of a first bearer to be established, and indication information of a network slice corresponding to the first bearer, and first indication information indicating the first DU UE AMBR; and
send, to the second DU, a second UE context setup request message, wherein the second UE context setup request message comprises an identifier of a second bearer to be established, and indication information of a network slice corresponding to the second bearer, and second indication information indicating the second DU UE-AMBR;
the first DU comprises:
at least one processor; and
a non-transitory computer-readable storage medium coupled to the at least one processor and storing programming instructions for execution by the at least one processor, the programming instructions instruct the at least one processor to send a first response message in response to the first UE context setup request message to the CU; and
the second DU comprises:
at least one processor; and
a non-transitory computer-readable storage medium coupled to the at least one processor and storing programming instructions for execution by the at least one processor, the programming instructions instruct the at least one processor to send a second response message in response to the second UE context setup request message to the CU.

17. The system according to claim 16, wherein
the programming instructions further instruct the at least one processor of the CU to send a radio resource control (RRC) message to the first DU;

the programming instructions further instruct the at least one processor of the first DU to send the RRC message to the terminal device, wherein the RRC message comprises an identifier of a successfully established session and an identifier of a successfully established bearer;

receive an RRC response message from the terminal device; and send the RRC response message to the CU.

18. The system according to claim 16, wherein the system further comprises an operation, administration and maintenance (OAM) system, the OAM system is adapted to configure the indication information of the network slice supported by the first DU.

19. The system according to claim 16, wherein the programming instructions further instruct the at least one processor of the first DU to send a connection setup request message to the CU, wherein the connection setup request message comprises information of network slice supported by the first DU; and the programming instructions further instruct the at least one processor of the CU to send a connection setup response message to the first DU.

20. The system according to claim 19, wherein the information of network slice supported by the first DU comprises: an identifier of a tracking area corresponding to at least one cell of the first DU and indication information of network slice supported by the tracking area.

21. The system according to claim 19, wherein the connection setup request message is a F1 setup request message.

22. The system according to claim 16, wherein the programming instructions further instruct the at least one processor of the first DU to send a configuration update message to the CU, wherein the configuration update message comprises updated information of network slice supported by the first DU; and the programming instructions further instruct the at least one processor of the CU to send a configuration update response message to the first DU.

23. The system according to claim 16, wherein the indication information of the network slice comprises single network slice selection assistance information (S-NSSAI), and the S-NSSAI comprises slice/service type.

24. The system according to claim 16, wherein the system further comprises a source network device, the source network device is configured to send a handover request message to the CU; and the programming instructions further instruct the at least one processor of the CU to send a handover request response message to the source network device; and wherein the source network device comprises one of a source radio access network device, a source access and mobility management network element, or a source CU.

25. The system according to claim 24, wherein the UE context setup request message further comprises configuration information of the source network device for at least one protocol stack corresponding to the bearer.

26. The system according to claim 25, wherein the at least one protocol stack comprises at least one of: a Radio Link Control (RLC) protocol stack, a Media Access Control (MAC) protocol stack, or a physical layer (PHY) protocol stack.

27. The system according to claim 16, wherein the system further comprises a core network device, the programming instructions further instruct the at least one processor of the CU to send a path switch request message to the core network device, wherein the path switch request message comprises an identifier of a session successfully established by the CU, or an identifier of a flow that corresponds to a session that is successfully established by the CU; and the core network device is configured to send a path switch response message to the CU.

28. The system according to claim 16, wherein the CU comprises an RRC protocol stack function, a Packet Data Convergence Protocol (PDCP) protocol stack function, and an SDAP protocol stack function; and the first DU comprises an RLC protocol stack function, a MAC protocol stack function, and a PHY protocol stack function.

* * * * *

UNITED STATES PATENT AND TRADEMARK OFFICE
CERTIFICATE OF CORRECTION

PATENT NO. : 10,939,333 B2
APPLICATION NO. : 16/506734
DATED : March 2, 2021
INVENTOR(S) : Yinghao Jin et al.

Page 1 of 1

It is certified that error appears in the above-identified patent and that said Letters Patent is hereby corrected as shown below:

On the Title Page

Item (54) in the Title, in Column 1, Line 3, delete "SLICE BASED" and insert -- SLICE-BASED --, therefor.

In the Specification

In Column 1, Line 3, delete "SLICE BASED" and insert -- SLICE-BASED --, therefor.

In the Claims

In Column 36, Line 32, in Claim 1, delete "equipment- aggregate" and insert -- equipment-aggregate --, therefor.

In Column 36, Line 42, in Claim 1, delete "DU" and insert -- DU, --, therefor.

In Column 38, Line 37, in Claim 16, delete "UE AMBR;" and insert -- UE-AMBR; --, therefor.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*